US012181815B2

(12) United States Patent
Someya et al.

(10) Patent No.: US 12,181,815 B2
(45) Date of Patent: Dec. 31, 2024

(54) FIXING DEVICE INCLUDING SEPARATOR WITH CONTACT PORTION AND IMAGE FORMING APPARATUS

(71) Applicants: Yukimichi Someya, Saitama (JP); Yuusuke Furuichi, Kanagawa (JP); Tomoya Adachi, Kanagawa (JP); Hiroyuki Shimada, Tokyo (JP)

(72) Inventors: Yukimichi Someya, Saitama (JP); Yuusuke Furuichi, Kanagawa (JP); Tomoya Adachi, Kanagawa (JP); Hiroyuki Shimada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/171,558

(22) Filed: Feb. 20, 2023

(65) Prior Publication Data

US 2023/0305457 A1 Sep. 28, 2023

(30) Foreign Application Priority Data

Mar. 22, 2022 (JP) ................................ 2022-045584

(51) Int. Cl.
*G03G 15/20* (2006.01)

(52) U.S. Cl.
CPC .................. *G03G 15/2028* (2013.01); *G03G 2215/00573* (2013.01)

(58) Field of Classification Search
CPC ........... G03G 15/2028; G03G 15/6532; G03G 2215/00573; B65H 29/54; B65H 29/56
(Continued)

(56) References Cited

U.S. PATENT DOCUMENTS 8,594,549 B2 * 11/2013 Shimokawa ....... G03G 15/2053 399/329
2011/0211876 A1 * 9/2011 Iwaya ................ G03G 15/2028 399/329
(Continued)

FOREIGN PATENT DOCUMENTS

JP 2006-153948 6/2006
JP 2006-235006 9/2006
(Continued)

OTHER PUBLICATIONS

U.S. Appl. No. 17/863,404, filed Jul. 13, 2022, Hiroyuki Shimada, et al.
(Continued)

*Primary Examiner* — Robert B Beatty
(74) *Attorney, Agent, or Firm* — Harness, Dickey & Pierce, P.L.C.

(57) ABSTRACT

A fixing device includes a fixing belt heated by a heater. A pressure roller presses against the fixing belt to form a nip therebetween, through which a recording medium is conveyed. A holding portion is disposed opposite an inner circumferential face of the fixing belt at each lateral end of the fixing belt in a longitudinal direction thereof. The holding portion rotatably holds the fixing belt. A separator separates the recording medium from the fixing belt. The separator includes a contact portion that contacts the fixing belt and is disposed outboard from a recording medium conveyance region in the longitudinal direction of the fixing belt. The recording medium is conveyed over the fixing belt in the recording medium conveyance region. The contact portion is disposed opposite the holding portion via the fixing belt. The separator further includes a biasing member that presses the contact portion toward the fixing belt.

20 Claims, 11 Drawing Sheets

(58) Field of Classification Search
USPC ........ 399/323, 329; 271/307, 311, 312, 313, 271/900
See application file for complete search history.

(56) References Cited

U.S. PATENT DOCUMENTS

| | | | | |
|---|---|---|---|---|
| 2013/0189005 | A1* | 7/2013 | Saito .................. | G03G 15/2053 399/323 |
| 2013/0236225 | A1 | 9/2013 | Ogawa et al. | |
| 2014/0227013 | A1* | 8/2014 | Takahashi .......... | G03G 15/2028 399/323 |
| 2014/0255064 | A1* | 9/2014 | Suzuki ............... | G03G 15/2028 399/329 |
| 2020/0103796 | A1* | 4/2020 | Furuichi ............ | G03G 15/2042 |
| 2021/0003947 | A1* | 1/2021 | Fujiwara ............ | G03G 15/2032 |
| 2021/0278790 | A1 | 9/2021 | Furuichi et al. | |
| 2022/0299920 | A1 | 9/2022 | Shimada et al. | |
| 2022/0308511 | A1 | 9/2022 | Someya et al. | |
| 2022/0357697 | A1 | 11/2022 | Furuichi | |
| 2022/0382191 | A1 | 12/2022 | Furuichi et al. | |
| 2022/0382192 | A1 | 12/2022 | Inoue et al. | |
| 2023/0297016 | A1* | 9/2023 | Someya ............. | G03G 15/2053 399/328 |

FOREIGN PATENT DOCUMENTS

| | | | | |
|---|---|---|---|---|
| JP | 2009-288587 | | 12/2009 | |
| JP | 2011-028081 | | 2/2011 | |
| JP | 2013-186259 | | 9/2013 | |
| JP | 2013-186394 | | 9/2013 | |
| JP | 2015-011167 | | 1/2015 | |
| JP | 2015-031891 | | 2/2015 | |
| JP | 2015025981 | A * | 2/2015 | ......... G03G 15/2028 |
| JP | 2017215508 | A * | 12/2017 | |
| JP | 2020-052345 | | 4/2020 | |

OTHER PUBLICATIONS

U.S. Appl. No. 17/864,434, filed Jul. 14, 2022, Yukimichi Someya, et al.

* cited by examiner

FIXING DEVICE INCLUDING SEPARATOR WITH CONTACT PORTION AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-045584, filed on Mar. 22, 2022, in the Japan Patent Office, the entire disclosure of which is hereby incorporated by reference herein.

BACKGROUND

Technical Field

Embodiments of this disclosure relate to a fixing device and an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

The image forming apparatuses form a toner image through image forming processes of electrophotographic recording, electrostatic recording, magnetic recording, or the like and transfer the toner image onto a recording medium (e.g., a sheet) by an indirect transfer method or a direct transfer method, thus forming an unfixed toner image on the recording medium. The image forming apparatuses include a fixing device that fixes the unfixed toner image on the recording medium. The fixing device includes a fixing rotator and a pressure roller. As the recording medium bearing the unfixed toner image is conveyed through a nip formed between the fixing rotator and the pressure roller, the fixing rotator and the pressure roller fix the unfixed toner image on the recording medium under heat and pressure.

The image forming apparatus that forms the toner image on the recording medium by electrophotography employs the fixing device that includes a fixing belt, that is, a thin belt, serving as the fixing rotator. The fixing belt has a decreased thermal capacity to save energy. For example, the fixing device further includes a heater that is disposed opposite an inner face of the fixing belt. The pressure roller presses against the heater via the fixing belt to form the nip between the fixing belt and the pressure roller.

Since the fixing belt has the decreased thermal capacity, the fixing belt is subject to temperature decrease. Since the heater has an increased thermal capacity that is greater than the decreased thermal capacity of the fixing belt, a temperature difference generates between the fixing belt and the heater. Hence, the fixing belt is subject to deformation. Additionally, the heater that is platy presses against the inner face of the fixing belt that is tubular, causing the fixing belt to suffer from deformation.

As the fixing belt deforms, the fixing belt changes an orbit substantially when the fixing belt is driven and rotated. Accordingly, a distance between the fixing belt and a stationary member disposed in proximity to the fixing belt also changes.

For example, the fixing device may include a separator that separates the recording medium bearing the fixed toner image from the fixing belt. The fixing belt may not secure a distance between the fixing belt and the separator stably. Accordingly, the separator may not separate the recording medium from the fixing belt properly. The separator may come into contact with the fixing belt, damaging the fixing belt.

SUMMARY

This specification describes below an improved fixing device. In one embodiment, the fixing device includes a fixing belt that is endless and rotates. A heater heats the fixing belt. A pressure roller presses against the fixing belt to form a nip between the fixing belt and the pressure roller, through which a recording medium is conveyed. The pressure roller rotates. A holding portion is disposed opposite an inner circumferential face of the fixing belt at each lateral end of the fixing belt in a longitudinal direction of the fixing belt. The holding portion rotatably holds the fixing belt. A separator separates the recording medium from the fixing belt. The separator includes a contact portion that contacts the fixing belt. The contact portion is disposed outboard from a recording medium conveyance region in the longitudinal direction of the fixing belt. The recording medium is conveyed over the fixing belt in the recording medium conveyance region. The contact portion is disposed opposite the holding portion via the fixing belt. The separator further includes a biasing member that presses the contact portion toward the fixing belt.

This specification further describes an improved image forming apparatus. In one embodiment, the image forming apparatus includes an image bearer that bears an image and the fixing device described above that fixes the image on a recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
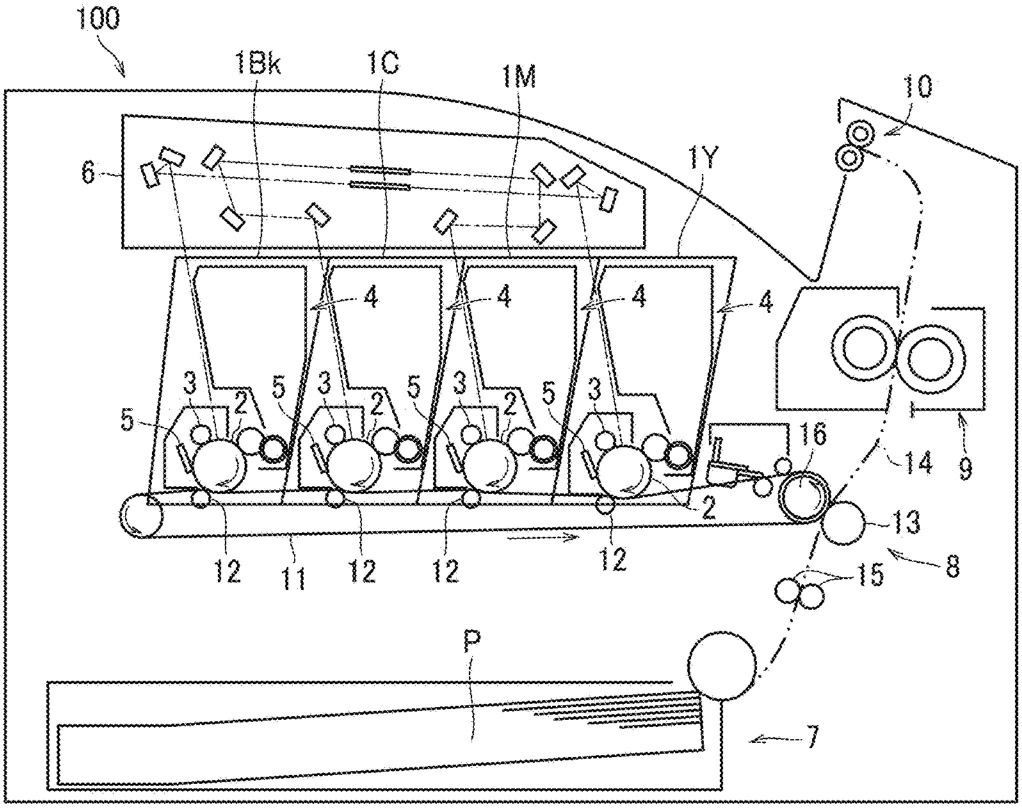
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Referring to drawings, a description is provided of a construction of a fixing device and an image forming apparatus according to embodiments of the present disclosure. The technology of the present disclosure is not limited to the embodiments described below and may be modified within scopes suggested by those skilled in art with other embodiments, addition, modification, deletion, and the like. The technology of the present disclosure encompasses various embodiments that achieve operations and advantages of the technology of the present disclosure.

A description is provided of a construction of an image forming apparatuses 100.

FIG. 1 is a schematic cross-sectional view of the image forming apparatus 100 according to an embodiment of the present disclosure. The image forming apparatus 100 according to the embodiment includes a fixing device 9 applied with the technology of the present disclosure and described below.

As illustrated in FIG. 1, the image forming apparatus 100 includes four image forming units 1Y, 1M, 1C, and 1Bk that are installed in an apparatus body of the image forming apparatus 100 such that the image forming units 1Y, 1M, 1C, and 1Bk are attached to and removed from the apparatus body of the image forming apparatus 100. The image forming units 1Y, 1M, 1C, and 1Bk have a similar construction. However, the image forming units 1Y, 1M, 1C, and 1Bk contain developers in different colors, that is, yellow, magenta, cyan, and black, respectively, which correspond to color separation components for a color image. Each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as the developer to the surface of the photoconductor 2 to form a toner image. The cleaner 5 cleans the surface of the photoconductor 2.

The image forming apparatus 100 further includes an exposure device 6, a sheet feeder 7, a transfer device 8, the fixing device 9 serving as a heating device, and an output device 10. The exposure device 6 exposes the surface of each of the photoconductors 2 and forms an electrostatic latent image thereon. The sheet feeder 7 supplies a sheet P serving as a recording medium to a sheet conveyance path 14. The transfer device 8 transfers the toner image formed on each of the photoconductors 2 onto the sheet P. The fixing device 9 fixes the toner image transferred onto a surface of the sheet P thereon. The output device 10 ejects the sheet P onto an outside of the image forming apparatus 100. Each of the image forming units 1Y, 1M, 1C, and 1Bk, that includes the photoconductor 2 and the charger 3, the exposure device 6, the transfer device 8, and the like construct an image forming device that forms the toner image on the sheet P.

The transfer device 8 includes an intermediate transfer belt 11, four primary transfer rollers 12, and a secondary transfer roller 13. The intermediate transfer belt 11 is an endless belt serving as an intermediate transferor. The primary transfer rollers 12 serve as primary transferors. The secondary transfer roller 13 serves as a secondary transferor. The intermediate transfer belt 11 is stretched taut across a plurality of rollers. The primary transfer rollers 12 transfer yellow, magenta, cyan, and black toner images formed on the photoconductors 2 onto the intermediate transfer belt 11, respectively, thus forming a full color toner image on the intermediate transfer belt 11. The secondary transfer roller 13 transfers the full color toner image formed on the intermediate transfer belt 11 onto the sheet P. The plurality of primary transfer rollers 12 is pressed against the photoconductors 2, respectively, via the intermediate transfer belt 11. Accordingly, the intermediate transfer belt 11 contacts each of the photoconductors 2, forming a primary transfer nip therebetween. On the other hand, the secondary transfer roller 13 is pressed against a roller 16, that is, one of the plurality of rollers across which the intermediate transfer belt 11 is stretched taut, via the intermediate transfer belt 11. Thus, a secondary transfer nip is formed between the secondary transfer roller 13 and the intermediate transfer belt 11.

The sheet conveyance path 14 is provided with a timing roller pair 15 at a position between the sheet feeder 7 and the secondary transfer nip defined by the secondary transfer roller 13.

Referring to FIG. 1, a description is provided of printing processes performed by the image forming apparatus 100 having the construction described above.

When the image forming apparatus 100 receives an instruction to start printing (e.g., a print job), a driver disposed inside the apparatus body of the image forming apparatus 100 drives and rotates the photoconductor 2 clockwise in FIG. 1 in each of the image forming units 1Y, 1M, 1C, and 1Bk. The charger 3 charges the surface of the photoconductor 2 uniformly at a high electric potential. The exposure device 6 exposes the charged surfaces of the photoconductors 2, respectively, according to image data sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the image forming units 1Y, 1M, 1C, and 1Bk supplies toner to the electrostatic latent image formed on the photoconductor 2, forming a toner image thereon.

The toner images formed on the photoconductors 2 reach the primary transfer nips defined by the primary transfer rollers 12 in accordance with rotation of the photoconductors 2, respectively. The primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11, thus forming a full color toner image thereon. The full color toner image formed on the intermediate transfer belt 11 is conveyed to the secondary transfer nip defined by the secondary transfer roller 13 in accordance with rotation of the intermediate transfer belt 11. The secondary transfer roller 13 transfers the full color toner image onto a sheet P conveyed through the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. The secondary transfer roller 13 transfers the full color toner image onto the sheet P. Thus, the sheet P bears the full color toner image. After the toner image is transferred onto the intermediate transfer belt 11, the cleaner 5 removes residual toner remaining on the photoconductor 2 therefrom.

The sheet P transferred with the full color toner image is conveyed to the fixing device 9 that fixes the full color toner image on the sheet P. Thereafter, the output device 10 ejects the sheet P onto the outside of the image forming apparatus 100, thus finishing a series of printing processes.

Recording media formed with toner images include, in addition to plain paper as a sheet P, thick paper, a postcard, an envelope, thin paper, coated paper, art paper, tracing paper, an overhead projector (OHP) transparency, plastic film, prepreg, and copper foil.

A description is provided of one example of a construction of the fixing device 9 according to an embodiment of the present disclosure.

Figure 2:
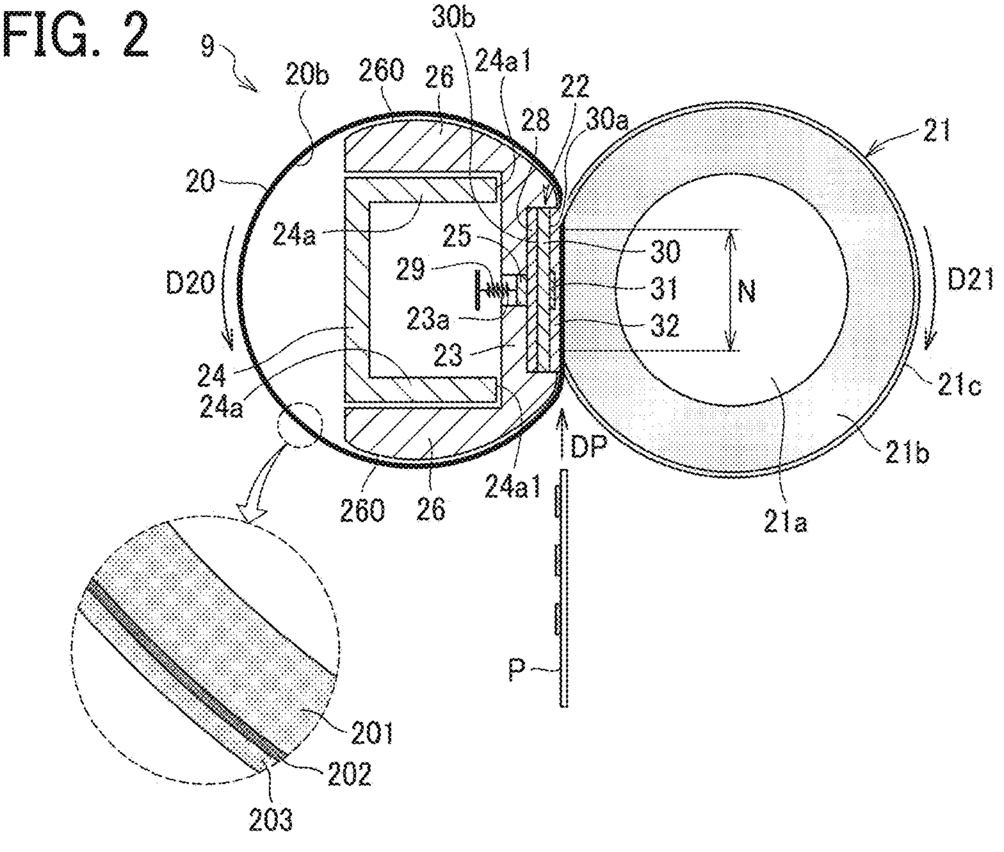
FIG. 2 is a schematic cross-sectional view of a fixing device incorporated in the image forming apparatus depicted in FIG. 1.

As illustrated in FIG. 2, the fixing device 9 includes a fixing belt 20, a pressure roller 21, a heater 22 serving as a heating body, a heater holder 23, a stay 24 serving as a support, thermistors 25 serving as temperature detectors, and a first thermal conductor 28. The fixing belt 20 is an endless belt. The pressure roller 21 contacts an outer circumferential face of the fixing belt 20 to form a fixing nip N between the fixing belt 20 and the pressure roller 21. The heater 22 heats the fixing belt 20. The heater holder 23 holds or supports the heater 22. The stay 24 supports the heater holder 23. Each of the thermistors 25 detects a temperature of the first thermal conductor 28.

The fixing belt 20, the pressure roller 21, the heater 22, the heater holder 23, the stay 24, the first thermal conductor 28, and the like extend in a longitudinal direction that is perpendicular to a paper surface in FIG. 2 and is parallel to a width direction of a sheet P conveyed through the fixing nip N, a belt width direction of the fixing belt 20, and an axial direction of the pressure roller 21.

The fixing belt 20 includes a tubular base layer 201 that is made of polyimide (PI) and has an outer diameter of 25 mm and a thickness in a range of from 40 μm to 120 μm, for example. The fixing belt 20 further includes a release layer 203 serving as an outermost surface layer. The release layer 203 is made of fluororesin, such as perfluoroalkoxy alkane (PFA) and polytetrafluoroethylene (PTFE), and has a thickness in a range of from 5 μm to 50 μm to enhance durability of the fixing belt 20 and facilitate separation of the sheet P from the fixing belt 20. The fixing belt 20 may further include an elastic layer that is interposed between the base layer 201 and the release layer 203. The elastic layer is made of rubber or the like and has a thickness in a range of from 50 μm to 500 μm.

Alternatively, the fixing belt 20 may not include the elastic layer. For example, the fixing belt 20 includes the base layer 201 that is tubular, an adhesion layer 202 that is disposed on the base layer 201, and the release layer 203 that is disposed on the adhesion layer 202 and serves as a surface layer. If the fixing belt 20 does not incorporate the elastic layer, an entirety of the fixing belt 20 may suffer from degradation in rigidity. Accordingly, when the fixing belt 20 halts, the fixing belt 20 is subject to deformation.

The base layer 201 of the fixing belt 20 may be made of heat-resistant resin such as polyetheretherketone (PEEK) or metal such as nickel (Ni) and stainless used steel (SUS), instead of polyimide. The fixing belt 20 may include an inner circumferential face 20*b* that is coated with polyimide, PTFE, or the like to produce a sliding layer.

The pressure roller 21 has an outer diameter of 25 mm, for example. The pressure roller 21 includes a core metal 21*a* that serves as a first layer and an innermost layer, an elastic layer 21*b* that serves as a second layer and is disposed on the core metal 21*a*, and a surface layer 21*c* that serves as a third layer and is disposed on the elastic layer 21*b*. The core metal 21*a* is solid and made of a conductive material. According to the embodiment, the core metal 21*a* is made of iron. The elastic layer 21*b* is made of a non-conductive material. According to the embodiment, the elastic layer 21*b* has a thickness of 3.5 mm and is made of silicone rubber. Since the elastic layer 21*b* is a non-conductive layer, the elastic layer 21*b* is elastic and stretchy without being added with a material that applies conductivity such as a filler.

The fixing device 9 further includes a biasing member that biases and moves the pressure roller 21 toward the fixing belt 20, pressing the pressure roller 21 against the heater 22 via the fixing belt 20. Thus, the fixing nip N is formed between the fixing belt 20 and the pressure roller 21. The fixing device 9 further includes a driver that drives and rotates the pressure roller 21. As the pressure roller 21 rotates in a rotation direction D21, the fixing belt 20 is driven and rotated by the pressure roller 21 in a rotation direction D20.

The heater 22 is a laminated heater that extends in the longitudinal direction thereof throughout an entire span of the fixing belt 20 in the longitudinal direction thereof. The heater 22 includes a base 30 that is platy, resistive heat generators 31 that are disposed on the base 30, and an insulating layer 32 that coats the resistive heat generators 31. The insulating layer 32 of the heater 22 contacts the inner circumferential face 20*b* of the fixing belt 20. The resistive heat generators 31 generate heat that is conducted to the fixing belt 20 through the insulating layer 32. Alternatively, the insulating layer 32 of the heater 22 may be disposed opposite the inner circumferential face 20*b* of the fixing belt 20 via a conductor such as a slide sheet. As a power supply applies an alternating current (AC) voltage to the heater 22, the resistive heat generators 31 generate heat mainly. According to the embodiment, the base 30 includes a fixing belt opposed face 30*a* that is disposed opposite the fixing belt 20 and the fixing nip N. The fixing belt opposed face 30*a* serves as a mounting face that mounts the resistive heat generators 31 and the insulating layer 32. Alternatively, the resistive heat generators 31 and the insulating layer 32 may be mounted on a heater holder opposed face 30*b* of the base 30, that is disposed opposite the heater holder 23. The heater holder opposed face 30*b* serves as an opposite face opposite to the fixing belt opposed face 30*a* serving as the mounting face. In this case, heat generated by the resistive heat generators 31 is conducted to the fixing belt 20 through the base 30. Hence, the base 30 is preferably made of a material having an increased thermal conductivity, such as aluminum nitride. The base 30 made of the material having the increased thermal conductivity causes the resistive heat generators 31 to heat the fixing belt 20 sufficiently, even if the resistive heat generators 31 are disposed on the heater holder opposed face 30*b* of the base 30.

The heater holder 23 and the stay 24 are disposed within a loop formed by the fixing belt 20 and disposed opposite the inner circumferential face 20*b* of the fixing belt 20. The stay 24 includes a channel made of metal. The stay 24 has both lateral ends in the longitudinal direction thereof, that are supported by side plates of the fixing device 9, respectively. Since the stay 24 supports the heater holder 23 and the heater 22, in a state in which the pressure roller 21 is pressed against the fixing belt 20, the heater 22 receives pressure from the pressure roller 21 precisely. Thus, the fixing nip N is formed stably between the fixing belt 20 and the pressure roller 21. According to the embodiment, the heater holder 23 has a thermal conductivity that is smaller than a thermal conductivity of the base 30.

The stay 24 includes arms 24*a* that extend in a pressing direction (e.g., a horizontal direction in FIG. 2) in which the pressure roller 21 applies pressure to the heater 22. The arms 24*a* include contact faces 24*a*1, respectively, that contact a stay opposed face of the heater holder 23, that is opposite to a pressure roller opposed face of the heater holder 23, that is disposed opposite the pressure roller 21. Thus, the stay 24 contacts the heater holder 23 rightward in FIG. 2 and supports the heater holder 23. Accordingly, the stay 24 prevents the heater holder 23 from being bent by pressure from the pressure roller 21 (e.g., bending in the longitudinal direction of the heater holder 23 according to the embodiment). The stay 24 may contact the heater holder 23 directly or may be disposed opposite the heater holder 23 indirectly via other member. For example, the stay 24 is disposed opposite the heater holder 23 via other member, that is, a sandwiched member sandwiched between the stay 24 and the heater holder 23 in the horizontal direction in FIG. 2. Additionally, the stay 24 contacts at least a part of the sandwiched member and the at least a part of the sandwiched member contacts the heater holder 23. The arms 24*a* of the stay 24 may extend in a direction that is equivalent or parallel to the pressing direction in which the pressure roller 21 applies pressure to the heater 22 via the fixing belt 20 or a direction that is angled relative to the pressing direction at an angle within a predetermined range. In the above-described cases also, the stay 24 prevents the heater holder 23 from being bent by pressure from the pressure roller 21.

Since the heater holder 23 is subject to high temperatures by heat from the heater 22, the heater holder 23 is preferably made of a heat-resistant material. For example, if the heater holder 23 is made of heat-resistant resin having a decreased thermal conductivity, such as liquid crystal polymer (LCP), the heater holder 23 suppresses conduction of heat thereto from the heater 22. Accordingly, the heater 22 heats the fixing belt 20 efficiently.

The fixing device 9 further includes a plurality of guides 26 that is mounted on the heater holder 23 and guides the fixing belt 20. The guides 26 are disposed upstream from and below the heater 22 and disposed downstream from and above the heater 22 in FIG. 2, respectively, in the rotation direction D20 of the fixing belt 20. The plurality of guides 26 disposed upstream and downstream from the heater 22 in the rotation direction D20 of the fixing belt 20 is arranged in the longitudinal direction of the heater 22 with a gap between the adjacent guides 26. Each of the guides 26 is substantially fan-shaped. Each of the guides 26 includes a fixing belt opposed face 260 that is disposed opposite the inner circumferential face 20*b* of the fixing belt 20 and defines an arc or a projecting curved face that extends in a circumferential direction of the fixing belt 20.

The heater holder 23 includes a plurality of openings 23*a* arranged in the longitudinal direction of the heater holder 23. Each of the openings 23*a* is a slot penetrating through the heater holder 23 in a thickness direction thereof. The thermistors 25 and thermostats described below are placed in the openings 23*a*, respectively. The fixing device 9 further includes springs 29 that bias and press the thermistors 25 and the thermostats against a back face of the first thermal conductor 28. Alternatively, each of the first thermal conductor 28 and a second thermal conductor described below may also include an opening similarly so that the springs 29 press the thermistors 25 and the thermostats against a back face of the base 30.

The first thermal conductor 28 is made of a material having a thermal conductivity greater than a thermal conductivity of the base 30. According to the embodiment, the first thermal conductor 28 is a plate made of aluminum. Alternatively, the first thermal conductor 28 may be made of copper, silver, graphene, or graphite, for example. Since the first thermal conductor 28 is platy, the first thermal conductor 28 improves accuracy of positioning of the heater 22 with respect to the heater holder 23 and the first thermal conductor 28.

Next, a description is provided of a method for calculating the thermal conductivity described above.

A thermal diffusivity of a target object was measured and a thermal conductivity was calculated based on the thermal diffusivity.

The thermal diffusivity was measured with a thermal diffusivity-thermal conductivity measurement device, ai-Phase Mobile 1u, manufactured by ai-Phase Co., Ltd. The thermal diffusivity was converted into the thermal conductivity based on a density and a specific heat capacity. The density was measured with a dry-process pycnometer, Accupyc 1330, manufactured by Shimadzu Corporation. The specific heat capacity was measured with a differential scanning calorimeter, DSC-60, manufactured by Shimadzu Corporation. Sapphire was used as a reference material having a known specific heat capacity.

According to an embodiment, the specific heat capacity was measured for five times to obtain an average at 50 degrees Celsius. Based on a density ρ, a specific heat capacity C, and a thermal diffusivity α obtained by the above-described measurement of the thermal diffusivity, a thermal conductivity λ is obtained by a formula (1) below.

$$\lambda = \rho \times C \times \alpha \tag{1}$$

In the fixing device 9 according to the embodiment, when printing starts, the driver drives and rotates the pressure roller 21 and the fixing belt 20 starts rotation in accordance with rotation of the pressure roller 21. Since the inner circumferential face 20*b* of the fixing belt 20 is contacted and guided by the fixing belt opposed face 260 of each of the guides 26, the fixing belt 20 rotates stably and smoothly. Additionally, as power is supplied to the resistive heat generators 31 of the heater 22, the heater 22 heats the fixing belt 20. In a state in which the temperature of the fixing belt 20 reaches a predetermined target temperature (e.g., a fixing temperature), as a sheet P bearing an unfixed toner image is conveyed through the fixing nip N formed between the fixing belt 20 and the pressure roller 21 as illustrated in FIG. 2, the fixing belt 20 and the pressure roller 21 fix the unfixed toner image on the sheet P under heat and pressure. The fixing belt 20 serves as a heated member that is heated by the heater 22.

A description is provided of a construction of a comparative fixing device.

The comparative fixing device includes a fixing belt serving as a flexible member, a flange serving as a restrictor, a pressure roller, separators, and flanges. The separators are disposed downstream from a nip formed between the fixing belt and the pressure roller in a recording medium conveyance direction in which a recording medium is conveyed. Each of the separators is disposed in proximity to a contact position where the fixing belt contacts the flange. The separators are combined with the flanges, respectively. As a construction that retains a relative distance between the fixing belt and the separators, each of the separators is provided with a roller serving as a contact member that contacts the fixing belt. The separator is biased through the roller.

The flanges disposed on both lateral ends of the fixing belt in a longitudinal direction thereof, respectively, restrict a trajectory of an outer periphery of the fixing belt. Conversely, the flanges do not restrict the trajectory of the outer periphery of the fixing belt in a center portion of the fixing belt in the longitudinal direction thereof. Hence, the fixing belt may not retain a constant distance between the fixing belt and an element disposed opposite the fixing belt in an entire span of the fixing belt in the longitudinal direction thereof.

In order to separate recording media of various sizes, for example, a recording medium having a small size, from the fixing belt, the separator is preferably disposed opposite the fixing belt in a region including the center portion of the fixing belt in the longitudinal direction thereof.

A description is provided of a construction of the fixing device 9 according to a first embodiment of the present disclosure and a construction of a fixing device 9A according to a second embodiment of the present disclosure.

Figure 3A:
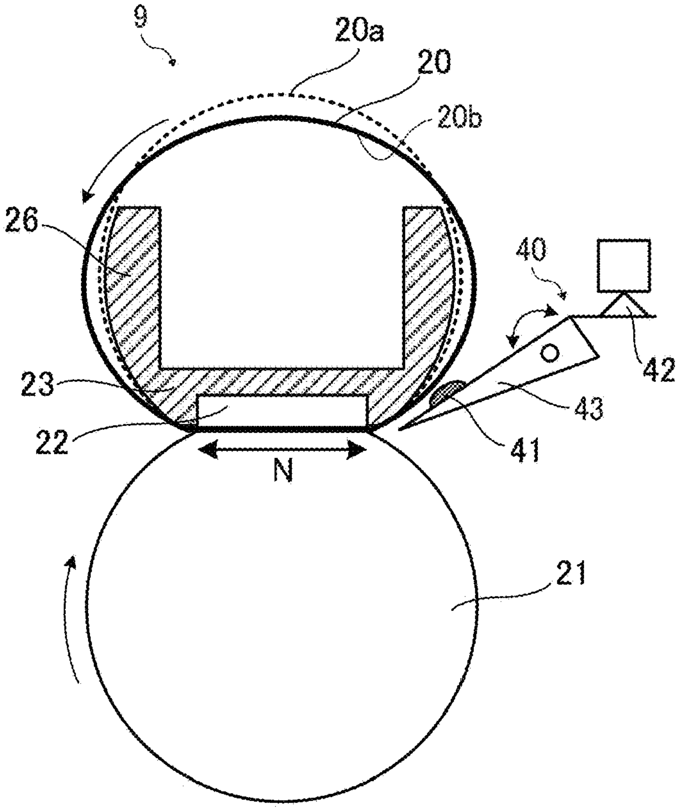
FIG. 3A is a schematic cross-sectional view of the fixing device depicted in FIG. 2 according to a first embodiment of the present disclosure.
Figure 4:
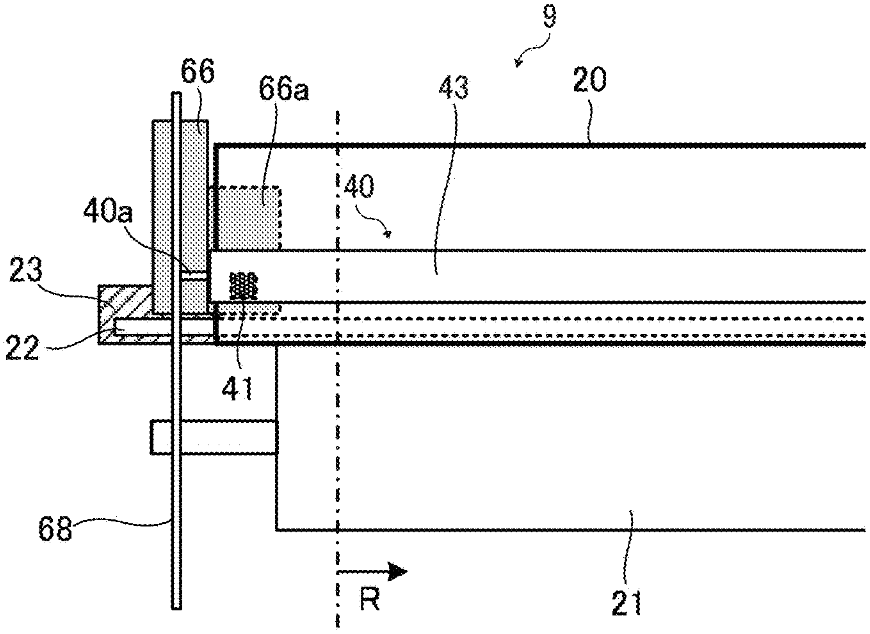
FIG. 4 is a schematic diagram of the fixing device depicted in FIG. 3A, illustrating one lateral end portion of the fixing device in a longitudinal direction thereof.
Figure 5:
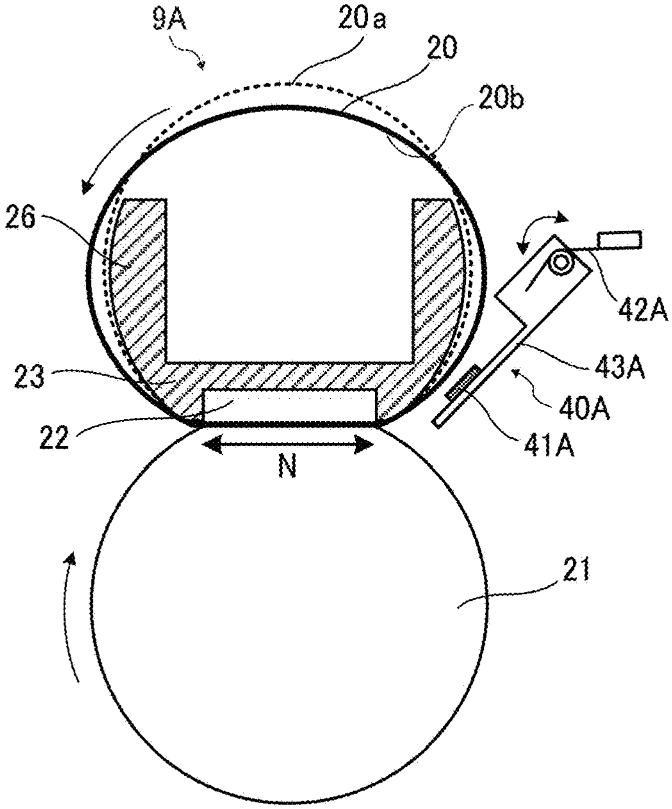
FIG. 5 is a schematic cross-sectional view of a fixing device according to a second embodiment of the present disclosure, that is installable in the image forming apparatus depicted in FIG. 1.
Figure 6:
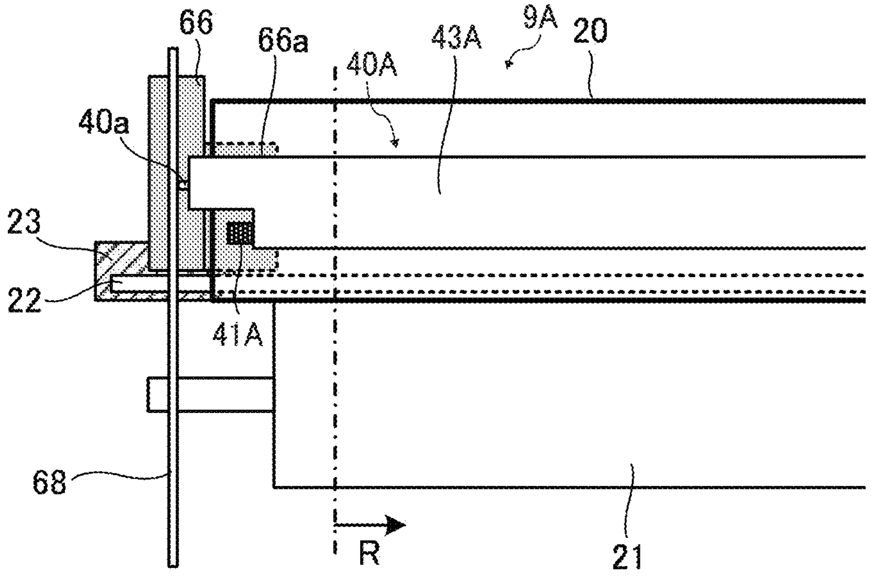
FIG. 6 is a schematic diagram of the fixing device depicted in FIG. 5, illustrating one lateral end portion of the fixing device in a longitudinal direction thereof.

FIGS. 3A and 4 illustrate the construction of the fixing device 9 according to the first embodiment of the present disclosure. FIGS. 5 and 6 illustrate the construction of the fixing device 9A according to the second embodiment of the present disclosure.

FIG. 3A is a schematic cross-sectional view of the fixing device 9 according to the first embodiment. FIG. 4 is a schematic diagram of the fixing device 9 according to the first embodiment, illustrating one lateral end portion of the fixing device 9 in a longitudinal direction thereof. FIG. 4 illustrates a construction of one lateral end portion of the fixing device 9 in the longitudinal direction thereof, that is similar to a construction of another lateral end portion of the fixing device 9 in the longitudinal direction thereof FIGS. 3A and 4 omit detailed illustration and description of elements of the fixing device 9, that are equivalent to the elements depicted in FIG. 2.

As illustrated in FIGS. 3A and 4, the fixing device 9 according to the first embodiment includes the fixing belt 20, the heater 22, the pressure roller 21, a belt holder 66, and a separator 40. The fixing belt 20 is an endless belt that rotates. The heater 22 serves as the heating body that heats the fixing belt 20. The pressure roller 21 presses against the heater 22 via the fixing belt 20 to form the fixing nip N between the fixing belt 20 and the pressure roller 21. The belt holder 66 includes a holding portion 66*a* disposed opposite the inner circumferential face 20*b* of the fixing belt 20 at each lateral end of the fixing belt 20 in the longitudinal direction thereof. The belt holder 66 rotatably holds the fixing belt 20. A sheet P serving as a recording medium is conveyed through the fixing nip N. The separator 40 separates the sheet P from the fixing belt 20.

The separator 40 includes a body 43, a biasing member 42, and a contact portion 41. The biasing member 42 is attached to the body 43 and biases and moves the body 43 toward the fixing belt 20. The contact portion 41 comes into contact with the fixing belt 20.

The contact portion 41 contacts the fixing belt 20 at a contact position that is disposed outboard from a sheet conveyance region R, where the sheet P is conveyed over the fixing belt 20, in the longitudinal direction thereof. The contact position is disposed opposite the holding portion 66*a* of the belt holder 66 via the fixing belt 20.

The holding portion 66*a* of the belt holder 66 contacts the inner circumferential face 20*b* of the fixing belt 20 and holds or supports each lateral end of the fixing belt 20 in the longitudinal direction thereof such that the fixing belt 20 slides over the holding portion 66*a*.

Figure 7A:
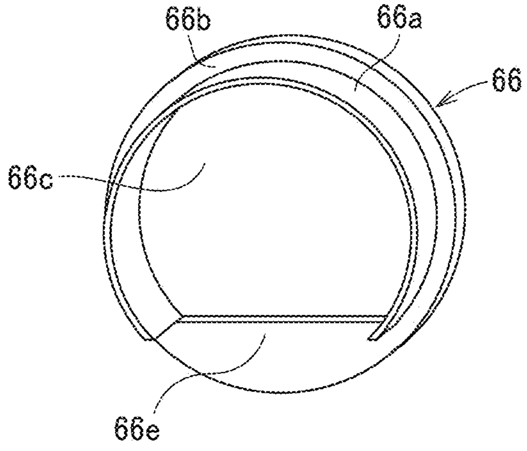
FIG. 7A is a perspective view of a belt holder incorporated in the fixing device depicted in FIG. 6.
Figure 7B:
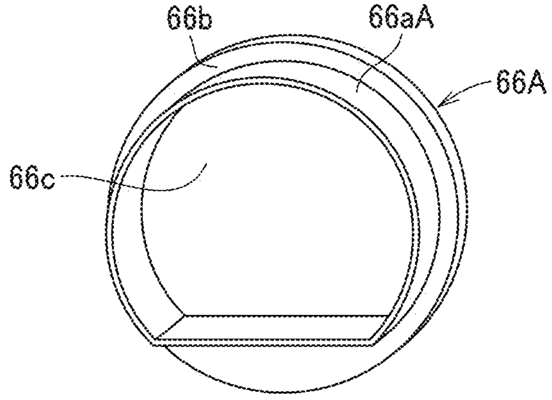
FIG. 7B is a perspective view of a belt holder as a variation of the belt holder depicted in FIG. 7A.

FIG. 7A is an external perspective view of the belt holder 66 as one example. FIG. 7B is an external perspective view of a belt holder 66A as another example. As illustrated in FIG. 7A, the belt holder 66 includes the holding portion 66*a*, a restrictor 66*b* (e.g., a flange), and an opening 66*c*. The holding portion 66*a* includes a slit 66*e* and is C-shaped in cross section. As illustrated in FIG. 7B, the belt holder 66A includes a holding portion 66*a*A that is contiguous and tubular.

Each of the belt holders 66 and 66A is molded by injection molding with resin, for example.

As illustrated in FIG. 4, the holding portion 66*a* is inserted into the loop formed by the fixing belt 20 and supports the fixing belt 20.

The restrictor 66*b* restricts motion of the fixing belt 20 in the longitudinal direction (e.g., the belt width direction) thereof.

The heater 22, the heater holder 23, and the like are disposed within the loop formed by the fixing belt 20. Each lateral end of each of the heater 22, the heater holder 23, and the like in the longitudinal direction thereof is secured to a side plate 68 through the opening 66*c*. Alternatively, the heater 22, the heater holder 23, and the like may be secured to the belt holder 66.

The belt holder 66 holds each lateral end of the fixing belt 20 in the longitudinal direction thereof. Hence, the fixing belt 20 is subject to deformation in an intermediate portion (e.g., a center portion) between both lateral ends of the fixing belt 20 in the longitudinal direction thereof in a circumferential span of the fixing belt 20, that is other than the fixing nip N, in the circumferential direction of the fixing belt 20. Accordingly, when fixing is interrupted and therefore the fixing belt 20 halts in a state in which the pressure roller 21 presses against the fixing belt 20, the fixing belt 20 is deformed and flattened horizontally as illustrated with a solid line in FIG. 3A. Conversely, a broken line 20*a* in FIG. 3A illustrates a trajectory of the fixing belt 20 that is heated sufficiently when a sufficient time elapses after the pressure roller 21 drives the fixing belt 20. When the pressure roller 21 starts driving the fixing belt 20, the fixing belt 20 starts rotation from a state in which the fixing belt 20 is deformed as illustrated with the solid line in FIG. 3A. The fixing belt 20 gradually draws the trajectory illustrated with the broken line 20*a* stably while the fixing belt 20 rotates regularly.

If the trajectory of the fixing belt 20 changes, the contact portion 41 that contacts the outer circumferential face of the fixing belt 20 is displaced in accordance with motion of the fixing belt 20. Accordingly, the separator 40 pivots, retaining a constant distance (e.g., a gap) between the separator 40 and the fixing belt 20.

According to the embodiment, since the fixing device 9 does not incorporate a restrictor that restricts deformation of the fixing belt 20, the trajectory of the fixing belt 20 changes similarly in the entire span of the fixing belt 20 in the longitudinal direction thereof. The contact portion 41 is mounted on each lateral end of the body 43 in a longitudinal direction thereof. The contact portion 41 contacting each lateral end of the fixing belt 20 in the longitudinal direction thereof moves in accordance with change in the trajectory of the fixing belt 20. An entirety of the separator 40 that is contiguous in the longitudinal direction (e.g., the belt width direction) of the fixing belt 20 moves in accordance with motion of the fixing belt 20, retaining the constant distance between the separator 40 and the fixing belt 20.

As illustrated in FIG. 4, the pressure roller 21 does not overlap the belt holder 66 in the longitudinal direction of the pressure roller 21. Accordingly, the fixing belt 20 does not have a contact region where the fixing belt 20 is contacted by both the pressure roller 21 and the belt holder 66, suppressing concentration of stress on a particular part of the fixing belt 20.

The separator 40 extends in a span in the longitudinal direction thereof, that is longer than the sheet conveyance region R serving as a recording medium conveyance region. The separator 40 is made of a material that is not limited. For example, the separator 40 is made of resin, metal, or the like.

The separator 40 further includes a pivot shaft 40*a* that pivotally supports the body 43 and is secured to or mounted on the side plate 68.

As illustrated in FIG. 3A, according to the embodiment, the biasing member 42 is a flat spring. However, the biasing member 42 is not limited to the flat spring as long as the biasing member 42 biases the body 43 toward the fixing belt 20. The fixing device 9 further includes a support mounted on the side plate 68. One end of the biasing member 42 is secured to the support.

The separator 40 includes the contact portion 41 that is mounted on each lateral end of the body 43 and disposed outboard from the sheet conveyance region R in a longitudinal direction of the separator 40. The contact portion 41 is disposed opposite the holding portion 66*a* of the belt holder 66 via the fixing belt 20. The contact portion 41 projects toward the fixing belt 20.

If the sheet P is jammed inside the fixing device 9, for example, conveyance of the sheet P is interrupted so that an operator (e.g., a user or a service engineer) removes the jammed sheet P. While the operator removes the jammed sheet P, the operator may press the separator 40 toward the fixing belt 20 excessively, damaging or breaking the fixing belt 20. To address the circumstance, according to the embodiment, the holding portion 66*a* disposed opposite the contact portion 41 restricts pressing of the separator 40 toward the fixing belt 20, preventing the operator from pressing the separator 40 excessively and therefore preventing the separator 40 from damaging or breaking the fixing belt 20.

Alternatively, at the contact position where the contact portion 41 contacts the fixing belt 20, while the fixing belt 20 and the pressure roller 21 rotate to fix the toner image on the sheet P regularly, the inner circumferential face 20*b* of the fixing belt 20 does not contact the holding portion 66*a*.

The fixing belt 20 contacts the contact portion 41 at a portion of the fixing belt 20, that does not contact the holding portion 66*a* while the fixing belt 20 fixes the toner image on the sheet P regularly. Accordingly, the contact portion 41 suppresses abrasion of the fixing belt 20, extending a life of the fixing belt 20.

The contact portion 41 contacts the fixing belt 20 at a position outboard from the sheet conveyance region R in the longitudinal direction of the fixing belt 20. Accordingly, the contact portion 41 does not slide over an imaging span of the fixing belt 20 where the fixing belt 20 contacts the toner image on the sheet P, preventing uneven fixing of the toner image on the sheet P and retaining improved quality of the toner image on the sheet P.

The contact portion 41 of the separator 40 is preferably made of an elastic material that is deformable elastically.

The contact portion 41 made of the elastic material prevents abrasion of the outer circumferential face of the fixing belt 20. Additionally, when the contact portion 41 presses against the holding portion 66*a* via the fixing belt 20, the contact portion 41 disperses load imposed on the fixing belt 20 and prevents depression of the fixing belt 20.

The contact portion 41 is preferably made of a material having a decreased abrasion resistance, that is not limited. For example, the contact portion 41 is made of foam of resin or the like, nonwoven fabric, or the like.

The contact portion 41 has a shape that is not limited. The contact portion 41 preferably has an increased contact area with which the contact portion 41 contacts the fixing belt 20. As the contact area with which the contact portion 41 contacts the fixing belt 20 increases, the contact portion 41 contacts the outer circumferential face of the fixing belt 20 with decreased pressure, preventing deformation and breakage of the fixing belt 20.

The contact portion 41 contacts the outer circumferential face of the fixing belt 20 with slight pressure, retaining a gap between an edge portion of the separator 40 and the fixing belt 20 in the sheet conveyance region R, that is appropriate to separate the sheet P from the fixing belt 20.

A state in which the contact portion 41 contacts the outer circumferential face of the fixing belt 20 with slight pressure denotes a state in which a portion of each of the contact portion 41 and the fixing belt 20, that contacts each other, is not deformed or displaced substantially. The biasing member 42 biases the body 43 with a biasing force that does not deform the fixing belt 20 substantially when the contact portion 41 contacts the outer circumferential face of the fixing belt 20.

The fixing device 9 according to the embodiment that has the construction described above suppresses change in the distance between the separator 40 and the fixing belt 20 that extend in the longitudinal direction thereof, preventing faulty separation of the sheet P from the fixing belt 20 and damage to the fixing belt 20. The holding portion 66*a* of the belt holder 66 restricts motion of the contact portion 41, preventing abnormal displacement of the separator 40 and breakage of the fixing belt 20. Additionally, the contact portion 41 contacts the fixing belt 20 at the position outboard from the sheet conveyance region R in the longitudinal direction of the fixing belt 20, preventing the fixing belt 20 from degrading quality of the toner image fixed on the sheet P. The contact portion 41 of the separator 40 is preferably disposed outboard from the resistive heat generators 31 of the heater 22, that are arranged, in the longitudinal direction of the heater 22. Accordingly, the contact portion 41 does not absorb heat from a portion of the fixing belt 20, that contacts the contact portion 41, reducing adverse effects caused by absorption of the heat.

The heater 22 serving as the heating body is disposed opposite the fixing nip N. The heater 22 supported by the heater holder 23 serves as a nip formation pad that is disposed opposite the pressure roller 21 via the fixing belt 20 to form the fixing nip N between the fixing belt 20 and the pressure roller 21.

Since the heater 22 is disposed opposite the fixing nip N, the fixing belt 20 suffers from variation in a cooling time after the fixing belt 20 fixes the toner image on the sheet P and is subject to deformation. To address the circumstance, with the above-described construction of the fixing device 9 according to the embodiment, the separator 40 moves in accordance with change in the orbit of the fixing belt 20 that is deformed. Accordingly, the separator 40 retains the constant distance between the separator 40 and the fixing belt 20, retaining proper separation of the sheet P from the fixing belt 20.

The heater 22 serving as the heating body is planar or platy. Since the heater 22 is tabular, the heater 22 has a decreased thermal capacity that improves a temperature increase speed and saves energy. However, the heater 22 that is tabular causes the fixing belt 20 to be subject to deformation, for example, substantial deformation. To address the circumstance, with the construction of the fixing device 9 according to the embodiment, the separator 40 retains the constant distance between the separator 40 and the fixing belt 20, retaining proper separation of the sheet P from the fixing belt 20.

As described above, the fixing belt 20 is preferably a belt made of a resin material. However, since the fixing belt 20 includes the base layer 201 that is made of resin and therefore has a rigidity smaller than a rigidity of a base layer made of metal, the fixing belt 20 is subject to deformation. To address the circumstance, with the construction of the fixing device 9 according to the embodiment, the separator 40 retains the constant distance between the separator 40 and the fixing belt 20, retaining proper separation of the sheet P from the fixing belt 20.

In order to form the fixing nip N, the pressure roller 21 may press against the heater 22 stationarily secured inside the fixing device 9. Alternatively, the heater 22 may press against the pressure roller 21 stationarily secured inside the fixing device 9.

Figure 3B:
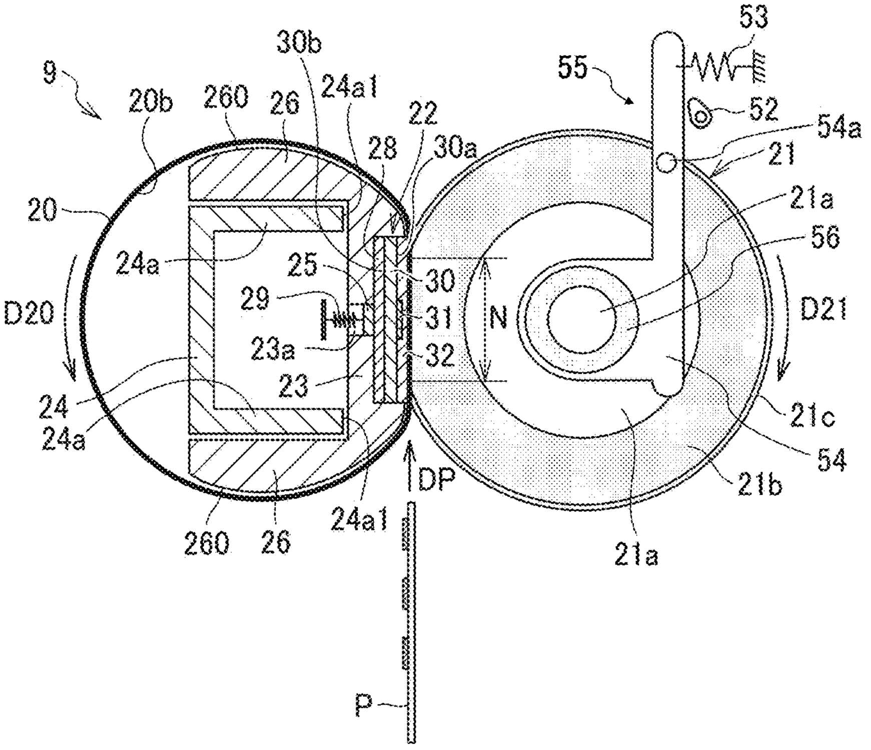
FIG. 3B is a schematic cross-sectional view of the fixing device depicted in FIG. 2, illustrating a pressure application-release assembly incorporated therein that moves a pressure roller to a pressing position.

However, in order to suppress change in the distance between the separator 40 and the fixing belt 20 and retain proper separation of the sheet P from the fixing belt 20, the pressure roller 21 preferably presses against the heater 22. For example, as illustrated in FIG. 3B, the fixing device 9 includes a pressure application-release assembly 55, serving as a pressure release mechanism, that presses the pressure roller 21 against the fixing belt 20. The pressure application-release assembly 55 presses the pressure roller 21 against the heater 22 via the fixing belt 20 to form the fixing nip N between the fixing belt 20 and the pressure roller 21.

Figure 3C:
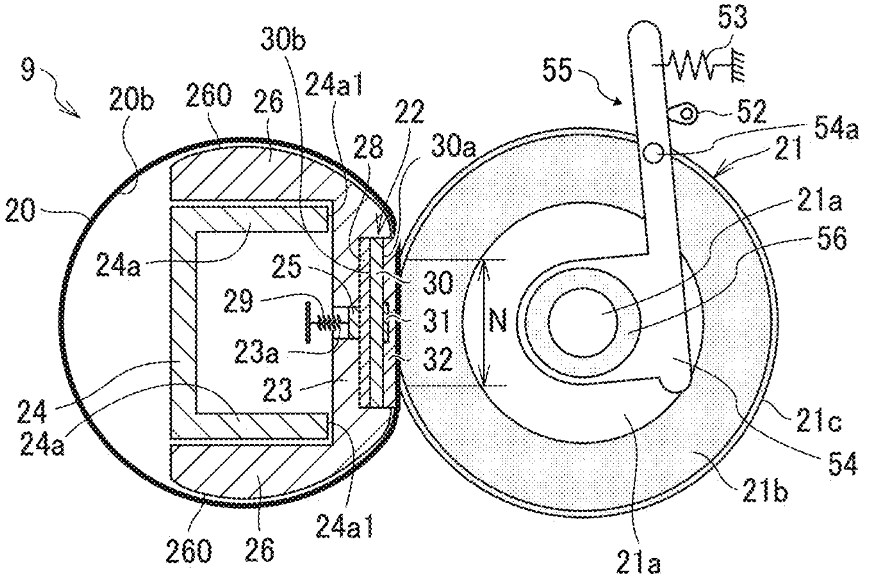
FIG. 3C is a schematic cross-sectional view of the fixing device depicted in FIG. 3B, illustrating the pressure application-release assembly that moves the pressure roller to a pressure release position.

The pressure application-release assembly 55 includes a cam 52 (e.g., an eccentric cam), a tension spring 53, a pressure lever 54 serving as a presser, and a support shaft 54*a*. The pressure lever 54 pivots about the support shaft 54*a*. One end of the pressure lever 54 is supported by a shaft of the core metal 21*a* of the pressure roller 21 through a bearing 56 that supports the pressure roller 21. Another end of the pressure lever 54 is coupled with one end of the tension spring 53. The cam 52 is pivotally supported by the side plate 68 depicted in FIG. 4 and is coupled with a motor. As the motor pivots the cam 52 to separate from the pressure lever 54 as illustrated in FIG. 3B, the tension spring 53 biases the pressure lever 54 to move the pressure roller 21 to a pressing position where the pressure roller 21 presses against the fixing belt 20 to form the fixing nip N to fix the toner image on the sheet P. As the motor pivots the cam 52 to contact the pressure lever 54 as illustrated in FIG. 3C, the pressure lever 54 moves the pressure roller 21 against a bias from the tension spring 53 to a pressure release position where the pressure roller 21 releases pressure applied to the fixing belt 20. Alternatively, instead of the motor, opening and closing of a cover of the image forming apparatus 100 may pivot the cam 52.

Figure 3D:
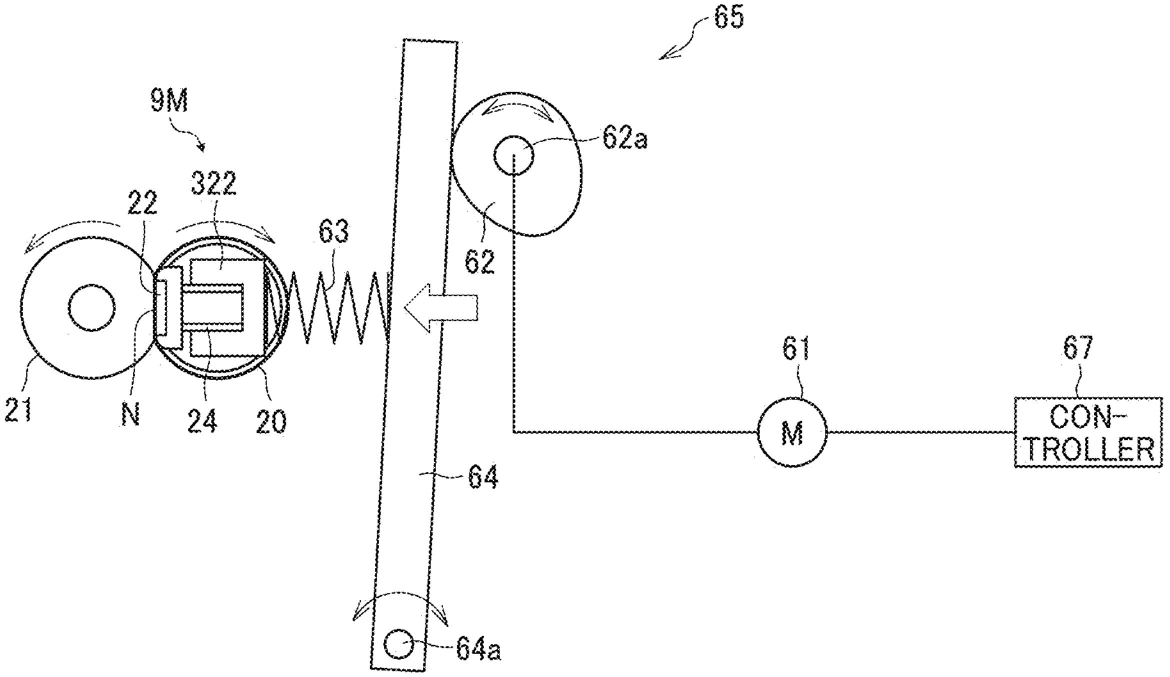
FIG. 3D is a schematic cross-sectional view of a fixing device as a modification example of the fixing device depicted in FIG. 3B.

FIG. 3D illustrates a fixing device 9M as a modification example of the fixing device 9 depicted in FIGS. 3B and 3C. The fixing device 9M includes a pressure application-release assembly 65, serving as a pressure release mechanism, that includes a flange 322, a cam 62, a cam shaft 62*a*, a spring 63, a pressure lever 64 serving as a presser, and a support shaft 64*a*.

The flange 322 is coupled with one end of the spring 63. The pressure lever 64 is coupled with another end of the spring 63. The pressure lever 64 pivots about the support shaft 64*a* mounted on one end of the pressure lever 64 in a longitudinal direction thereof. The cam 62 contacts another end of the pressure lever 64 in the longitudinal direction thereof. The spring 63 is coupled with a spring opposed face of the pressure lever 64, that is disposed opposite the spring 63 and is opposite to a cam opposed face of the pressure lever 64, that is disposed opposite the cam 62. The cam 62 rotates about the cam shaft 62*a*. The fixing device 9M further includes a motor 61 that drives and rotates the cam shaft 62*a* and a controller 67 that controls the motor 61. As the cam 62 applies pressure to one end of the pressure lever 64 in the longitudinal direction thereof, the pressure is transmitted to the flange 322 through the spring 63. The flange 322 that supports the fixing belt 20 presses the fixing belt 20 against the pressure roller 21.

As described above, the fixing belt 20 rotates in accordance with rotation of the pressure roller 21 that drives and rotates the fixing belt 20. Since the fixing belt 20 is driven and rotated by the pressure roller 21, the fixing belt 20 is separated from interior elements situated within the loop formed by the fixing belt 20 with a substantial clearance therebetween. Accordingly, the fixing belt 20 is subject to deformation. To address the circumstance, with the construction of the fixing device 9 according to the embodiment, the separator 40 retains the constant distance between the separator 40 and the fixing belt 20, retaining proper separation of the sheet P from the fixing belt 20.

The fixing belt 20 preferably has an outer diameter that is greater than an outer diameter of the pressure roller 21. As the outer diameter of the fixing belt 20 increases, a length of the fixing nip N and a length of the heater 22 disposed opposite the fixing nip N also increase in a sheet conveyance direction DP in which the sheet P is conveyed as illustrated in FIG. 2. Accordingly, the fixing device 9 improves productivity and is installed in the image forming apparatus 100 that achieves enhanced production (e.g., high speed printing).

The heater 22 preferably includes the plurality of resistive heat generators 31 that is arranged in the longitudinal direction of the heater 22. Hence, the heater 22 has an increased length.

A size of deformation of the fixing belt 20 varies depending on the length of the heater 22 or the length of the fixing nip N in the sheet conveyance direction DP with respect to the outer diameter of the fixing belt 20. To address the circumstance, with the construction of the fixing device 9 according to the embodiment, the separator 40 retains the constant distance between the separator 40 and the fixing belt 20, retaining proper separation of the sheet P from the fixing belt 20.

As illustrated in FIGS. 3B and 3C, the fixing device 9 includes the pressure application-release assembly 55 that is attached to the pressure roller 21. The pressure application-release assembly 55 moves the pressure roller 21 from the pressing position where the pressure roller 21 presses against the fixing belt 20 to the pressure release position where the pressure roller 21 releases pressure applied to the fixing belt 20.

The pressure roller 21 disposed at the pressing position presses against the fixing belt 20 with pressure under which the fixing belt 20 and the pressure roller 21 fix the toner image on the sheet P properly. As the pressure application-release assembly 55 moves the pressure roller 21 to the pressure release position, the pressure roller 21 decreases deformation of the fixing belt 20. Additionally, the pressure roller 21 facilitates removal of the sheet P jammed between the pressure roller 21 and the fixing belt 20. Further, the pressure roller 21 moderates compression set of the elastic layer 21*b*.

A description is provided of the construction of the fixing device 9A according to the second embodiment of the present disclosure.

FIGS. 5 and 6 illustrate the construction of the fixing device 9A according to the second embodiment of the present disclosure.

FIG. 5 is a schematic cross-sectional view of the fixing device 9A according to the second embodiment. FIG. 6 is a schematic diagram of the fixing device 9A according to the second embodiment, illustrating one lateral end portion of the fixing device 9A in a longitudinal direction thereof. FIG. 6 illustrates a construction of one lateral end portion of the fixing device 9A in the longitudinal direction thereof, that is similar to a construction of another lateral end portion of the fixing device 9A in the longitudinal direction thereof.

FIGS. 5 and 6 omit detailed illustration and description of elements of the fixing device 9A, that are equivalent to the elements depicted in FIGS. 2, 3A, 3B, 3C, and 4.

The fixing device 9A according to the second embodiment includes a separator 40A including a contact portion 41A, a biasing member 42A, and a body 43A. The contact portion 41A is combined or molded with the body 43A.

The contact portion 41A has a shape that is not limited. The contact portion 41A preferably has an increased contact area with which the contact portion 41A contacts the fixing belt 20. As the contact area with which the contact portion 41A contacts the fixing belt 20 increases, the contact portion 41A contacts the outer circumferential face of the fixing belt 20 with decreased pressure, preventing deformation and breakage of the fixing belt 20.

In order to prevent abrasion of the outer circumferential face of the fixing belt 20, the contact portion 41A that contacts the fixing belt 20 is preferably made of a low friction material.

The contact portion 41A has a shape that is not limited. The contact portion 41A preferably contacts the fixing belt 20 with a minimum contact area that achieves advantages.

According to the second embodiment, the biasing member 42A is a torsion spring (e.g., a helical torsion spring).

Like the biasing member 42 of the fixing device 9 according to the first embodiment, the biasing member 42A biases the body 43A with a biasing force that does not deform the fixing belt 20 when the contact portion 41A contacts the outer circumferential face of the fixing belt 20.

A description is provided of a construction of each of fixing devices and an image forming apparatus according to other embodiments of the present disclosure.

Figure 8:
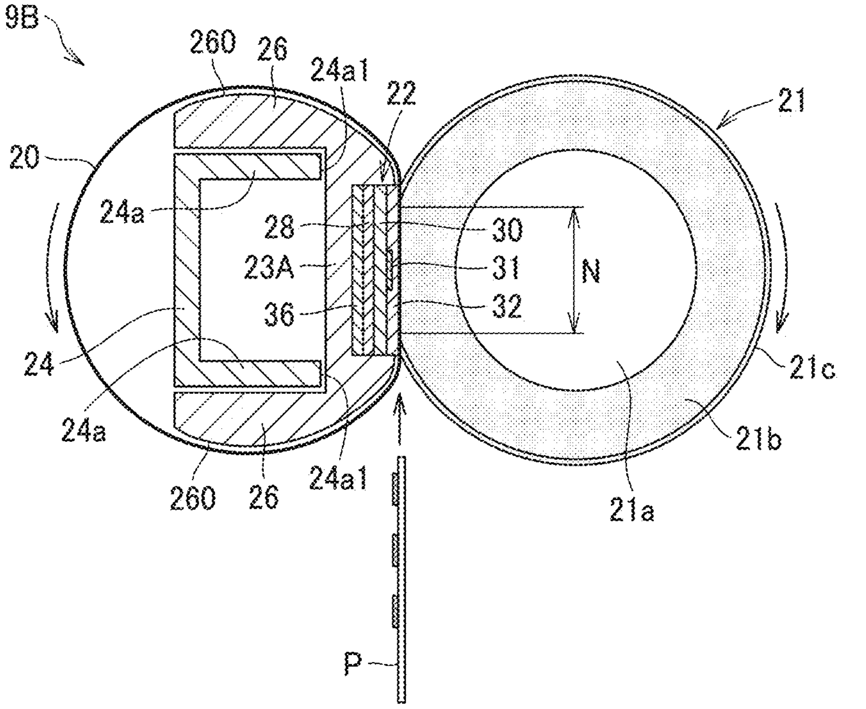
FIG. 8 is a schematic cross-sectional view of a fixing device according to another embodiment of the present disclosure, that is installable in the image forming apparatus depicted in FIG. 1.

FIG. 8 illustrates a fixing device 9B according to an embodiment of the present disclosure, that includes second thermal conductors 36 and a heater holder 23A. The second thermal conductors 36 are sandwiched between the heater holder 23A and the first thermal conductor 28. Each of the second thermal conductors 36 is disposed at a position different from a position of the first thermal conductor 28 in a laminating direction (e.g., a horizontal direction in FIG. 8) in which the stay 24, the heater holder 23A, the second thermal conductor 36, the first thermal conductor 28, and the heater 22 are arranged. Specifically, the second thermal conductors 36 are superimposed on the first thermal conductor 28. Unlike FIG. 2 illustrating the fixing device 9, FIG. 8 illustrates a cross section, that crosses an arrangement direction in which the second thermal conductors 36 are arranged, where the second thermal conductor 36 is disposed and the thermistor 25 is not disposed in the laminating direction.

Each of the second thermal conductors 36 is made of a material having a thermal conductivity greater than a thermal conductivity of the base 30. For example, each of the second thermal conductors 36 is made of graphene or graphite. According to the embodiment, the second thermal conductor 36 is a graphite sheet having a thickness of 1 mm. Alternatively, the second thermal conductor 36 may be a plate made of aluminum, copper, silver, or the like.

Figure 9:
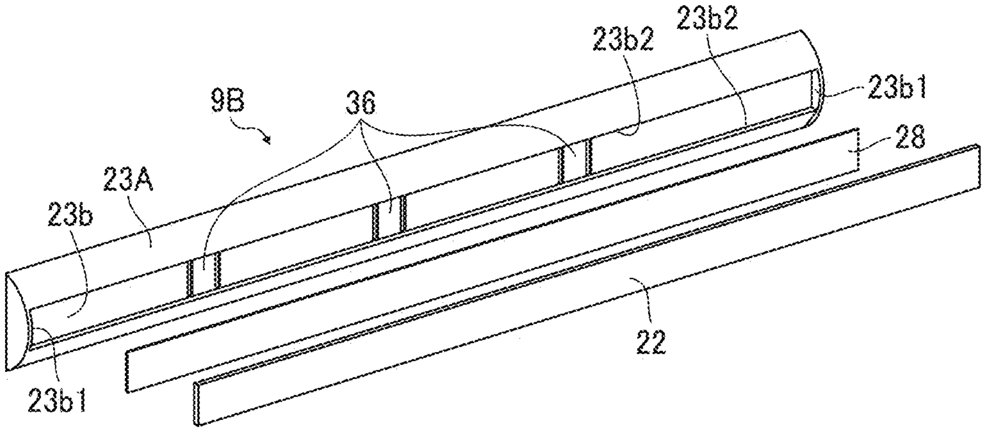
FIG. 9 is a perspective view of a heater, a first thermal conductor, second thermal conductors, and a heater holder incorporated in the fixing device depicted in FIG. 8.

As illustrated in FIG. 9, the plurality of second thermal conductors 36 is arranged on a plurality of parts on the heater holder 23A in a longitudinal direction thereof, respectively. The heater holder 23A includes a recess 23*b* that includes cavities placed with the second thermal conductors 36, respectively. The cavities are stepped down by one step from other portion of the recess 23*b*. The recess 23*b* includes walls 23*b*1 and 23*b*2. The walls 23*b*1 are disposed at both lateral ends of the heater holder 23A, respectively, in the longitudinal direction thereof. The walls 23*b*2 are disposed at both ends of the heater holder 23A, respectively, in an orthogonal direction perpendicular to the longitudinal direction of the heater holder 23A. The second thermal conductor 36 and the heater holder 23A define a gap therebetween at both lateral ends of the second thermal conductor 36 in the longitudinal direction of the heater holder 23A. Thus, the second thermal conductor 36 suppresses conduction of heat therefrom to the heater holder 23A, causing the heater 22 to heat the fixing belt 20 efficiently. FIG. 9 omits illustration of the guides 26 depicted in FIG. 8.

Figure 10:
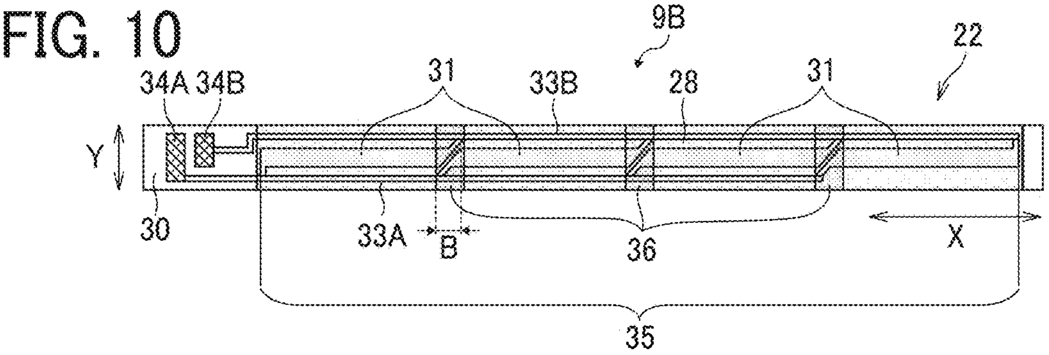
FIG. 10 is a plan view of the heater depicted in FIG. 9, illustrating an arrangement of the first thermal conductor and the second thermal conductors.
Figure 14:
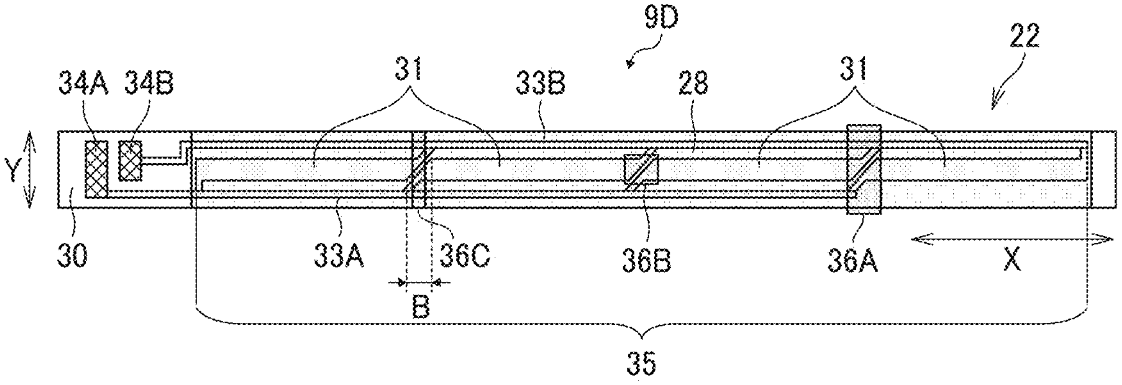
FIG. 14 is a plan view of the heater depicted in FIG. 10, illustrating an arrangement of second thermal conductors as a variation of the second thermal conductors depicted in FIG. 10.

As illustrated in FIG. 10, the heater 22 further includes feeders 33A and 33B and electrodes 34A and 34B that are mounted on the base 30. The second thermal conductor 36 that is hatched is disposed opposite a gap B between the adjacent resistive heat generators 31 and overlaps at least a part of the adjacent resistive heat generators 31 in a longitudinal direction X of the heater 22, that is, an arrangement direction in which the resistive heat generators 31 are arranged. According to the embodiment, the second thermal conductor 36 extends throughout an entire span of the gap B. FIG. 10 and FIG. 14 referred to in a description below illustrate the first thermal conductor 28 that is disposed opposite and spans a heat generating portion 35 in the longitudinal direction X thereof. Alternatively, the first thermal conductor 28 may span differently.

The fixing device 9B according to the embodiment includes, in addition to the first thermal conductor 28, the second thermal conductors 36 each of which is disposed opposite the gap B and overlaps at least a part of the adjacent resistive heat generators 31 in the longitudinal direction X of the heater 22. The second thermal conductors 36 improve efficiency in conduction of heat at the gaps B in the longitudinal direction X of the heater 22 in which the resistive heat generators 31 are arranged, suppressing uneven temperature of the heater 22 in the longitudinal direction X thereof.

Figure 11:
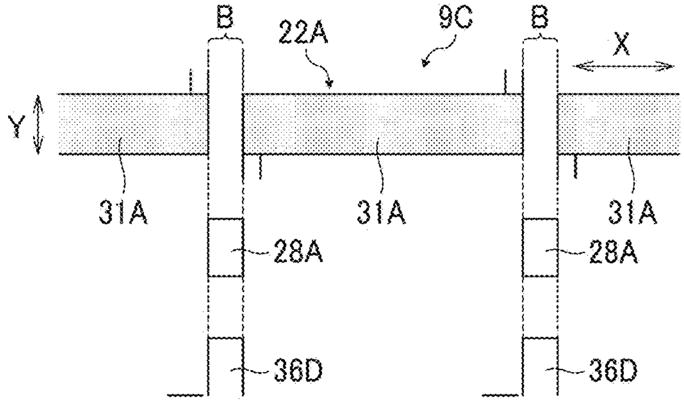
FIG. 11 is a plan view of a heater as a variation of the heater depicted in FIG. 10, illustrating an arrangement of first thermal conductors and second thermal conductors as a variation of the first thermal conductor and the second thermal conductors depicted in FIG. 10.

FIG. 11 illustrates a fixing device 9C including first thermal conductors 28A, second thermal conductors 36D, and a heater 22A including resistive heat generators 31A. The first thermal conductor 28A and the second thermal conductor 36D are preferably disposed opposite the entire span of the gap B in the longitudinal direction X of the heater 22A. Accordingly, the first thermal conductor 28A and the second thermal conductor 36D improve efficiency in conduction of heat at the gap B compared to an outboard region of the heater 22A, which is other than the gap B. FIG. 11 illustrates the resistive heat generators 31A shifted from the first thermal conductors 28A and the second thermal conductors 36D vertically in FIG. 11 for convenience. Practically, the resistive heat generators 31A are substantially leveled with the first thermal conductors 28A and the second thermal conductors 36D in an orthogonal direction Y perpendicular to the longitudinal direction X of the heater 22A. Alternatively, the first thermal conductors 28A and the second thermal conductors 36D may be disposed with respect to the resistive heat generators 31A with other arrangement. For example, the first thermal conductor 28A and the second thermal conductor 36D may span or cover a part or an entirety of the resistive heat generator 31A in the orthogonal direction Y perpendicular to the longitudinal direction X of the heater 22A.

According to an embodiment that is different from the embodiments described above, each of a first thermal conductor (e.g., the first thermal conductors 28 and 28A) and a second thermal conductor (e.g., the second thermal conductors 36 and 36D) is made of a graphene sheet. Hence, each of the first thermal conductor and the second thermal conductor has an enhanced thermal conductivity in a predetermined direction along a surface of the graphene sheet, that is, an arrangement direction in which resistive heat generators (e.g., the resistive heat generators 31 and 31A) are arranged, not a thickness direction of the graphene sheet. Accordingly, the first thermal conductor and the second thermal conductor suppress uneven temperature of a heater (e.g., the heaters 22 and 22A) and the fixing belt 20 in the arrangement direction effectively.

Figure 12:
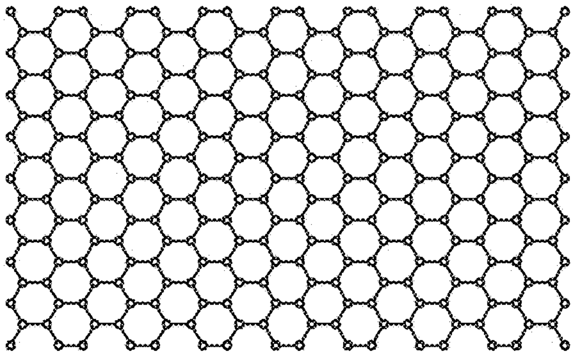
FIG. 12 is a diagram of a crystalline structure of atoms of graphene.

Graphene is thin powder. As illustrated in FIG. 12, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms. The graphene sheet may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene C60, C70, and C80, 3-coordinated carbon atoms, or the like.

The graphene sheet is artificial and is produced by chemical vapor deposition (CVD), for example.

The graphene sheet is commercially available. A size and a thickness of the graphene sheet and a number of layers and the like of the graphite sheet described below are measured with a transmission electron microscope (TEM), for example.

Figure 13:
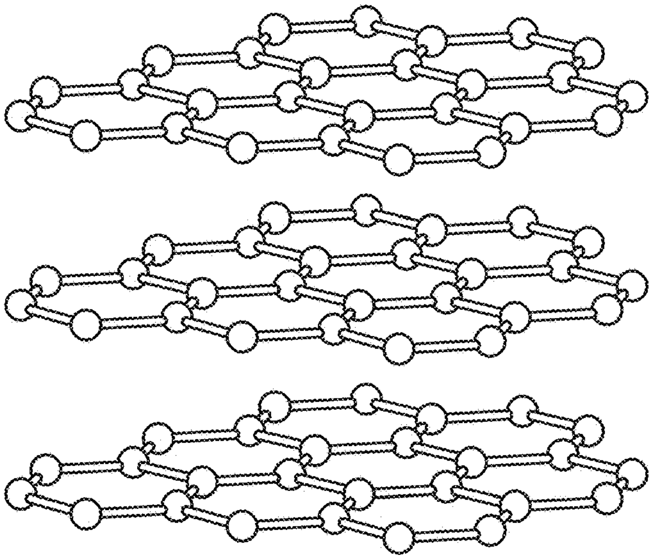
FIG. 13 is a diagram of a crystalline structure of atoms of graphite.

Graphite is constructed of stacked layers of graphene and is highly anisotropic in thermal conduction. As illustrated in FIG. 13, graphite has a plurality of layers, each of which is constructed of hexagonal fused rings of carbon atoms, that are bonded planarly. The plurality of layers defines a crystalline structure. In the crystalline structure, adjacent carbon atoms in the layer are bonded with each other by a covalent bond. Bonding between layers of carbon atoms is established by the van der Waals bond. The covalent bond achieves bonding greater than bonding by the van der Waals bond. Graphite is highly anisotropic with bonding within the layer and bonding between the layers.

For example, a first thermal conductor (e.g., the first thermal conductors 28 and 28A) or a second thermal conductor (e.g., the second thermal conductors 36 and 36D) is made of graphite. Accordingly, the first thermal conductor or the second thermal conductor attains an efficiency in conduction of heat in an arrangement direction in which resistive heat generators (e.g., the resistive heat generators 31 or 31A) are arranged, which is greater than an efficiency in conduction of heat in a thickness direction, that is, the laminating direction in which the stay 24, the heater holder 23A, the second thermal conductor 36 or 36D, the first thermal conductor 28 or 28A, and the heater 22 or 22A are arranged, thus suppressing conduction of heat to the heater holder 23A. Consequently, the first thermal conductor or the second thermal conductor suppresses uneven temperature of the heater 22 or 22A in the longitudinal direction X thereof efficiently. Additionally, the first thermal conductor or the second thermal conductor minimizes heat conducted to the heater holder 23A. The first thermal conductor or the second thermal conductor that is made of graphite attains enhanced heat resistance that inhibits oxidation at approximately 700 degrees Celsius.

The graphite sheet has a physical property and a dimension that are adjusted properly according to a function of the first thermal conductor or the second thermal conductor. For example, the graphite sheet is made of graphite having enhanced purity or single crystal graphite. The graphite sheet has an increased thickness to enhance anisotropic thermal conduction. In order to perform high speed fixing, each of the fixing devices 9, 9A, 9B, and 9C employs the graphite sheet having a decreased thickness to decrease thermal capacity of each of the fixing devices 9, 9A, 9B, and 9C. If the fixing nip N and the heater 22 or 22A have an increased length in the longitudinal direction X thereof, the first thermal conductor or the second thermal conductor also has an increased length in the longitudinal direction X thereof.

In view of increasing mechanical strength, the graphite sheet preferably has a number of layers that is not smaller than 11 layers. The graphite sheet may include a part constructed of a single layer and another part constructed of a plurality of layers.

The second thermal conductor 36 is disposed opposite the gap B between the adjacent resistive heat generators 31 and overlaps at least a part of the adjacent resistive heat generators 31 in the longitudinal direction X of the heater 22 in which the resistive heat generators 31 are arranged. Hence, the second thermal conductor 36 may be positioned with respect to the resistive heat generators 31 differently from the second thermal conductor 36 depicted in FIG. 10. For example, FIG. 14 illustrates a fixing device 9D including a second thermal conductor 36A that protrudes beyond the base 30 bidirectionally in the orthogonal direction Y perpendicular to the longitudinal direction X of the heater 22. The fixing device 9D further includes a second thermal conductor 36B that is disposed within a span of the resistive heat generator 31 in the orthogonal direction Y. The fixing device 9D further includes a second thermal conductor 36C that spans a part of the gap B.

Figure 15:
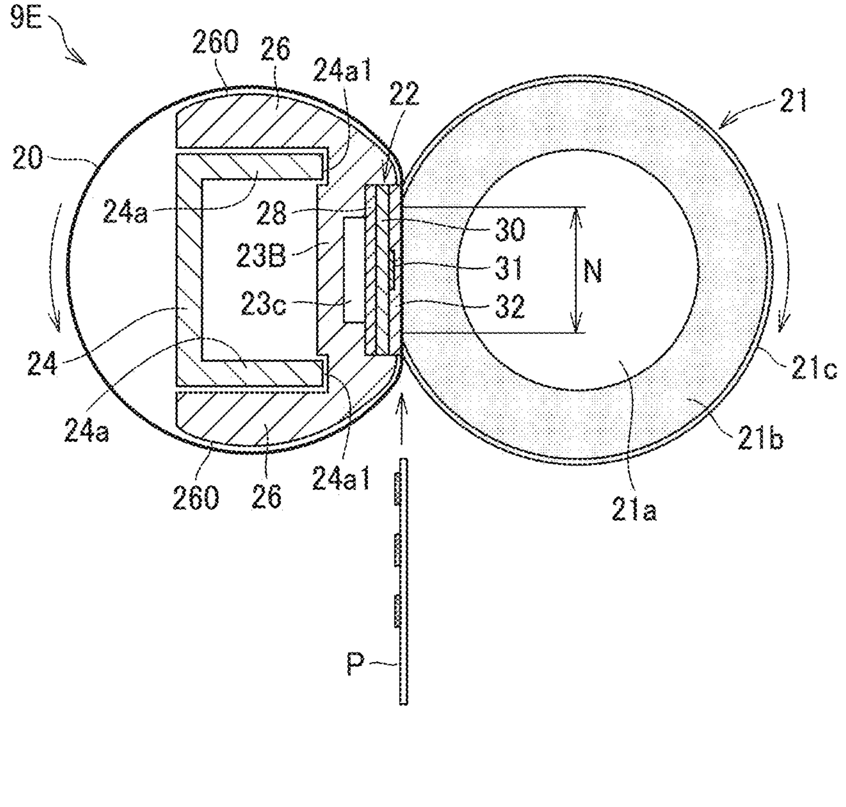
FIG. 15 is a schematic cross-sectional view of a fixing device according to yet another embodiment of the present disclosure, that is installable in the image forming apparatus depicted in FIG. 1.

FIG. 15 illustrates a fixing device 9E according to an embodiment of the present disclosure that includes a clearance interposed between the first thermal conductor 28 and a heater holder 23B in a thickness direction of the heater holder 23B (e.g., a horizontal direction in FIG. 15). For example, the heater holder 23B includes a retracted portion 23*c* that is disposed in a part of the recess 23*b* depicted in FIG. 9. The recess 23*b* accommodates the heater 22, the first thermal conductor 28, and the second thermal conductors 36. The retracted portion 23*c* is disposed outboard from the second thermal conductor 36 in the longitudinal direction X of the heater 22, that is, the arrangement direction in which the resistive heat generators 31 are arranged. The retracted portion 23*c* spans a part of the recess 23*b* in the orthogonal direction Y. A part of the recess 23*b* is stepped down from other part of the recess 23*b*, that accommodates the first thermal conductor 28, to produce the retracted portion 23*c* serving as a thermal insulation layer. Accordingly, the heater holder 23B contacts the first thermal conductor 28 with a decreased contact area, thus suppressing conduction of heat from the first thermal conductor 28 to the heater holder 23B and causing the heater 22 to heat the fixing belt 20 efficiently. On a cross section that crosses a longitudinal direction of the fixing device 9E and is provided with the second thermal conductor 36, the second thermal conductor 36 contacts the heater holder 23B as illustrated in FIG. 8 illustrating the fixing device 9B according to the embodiment described above.

According to the embodiment, the retracted portion 23*c* spans an entirety of the resistive heat generator 31 in the orthogonal direction Y (e.g., a vertical direction in FIG. 15) of the heater 22. Thus, the retracted portion 23*c* suppresses conduction of heat from the first thermal conductor 28 to the heater holder 23B, causing the heater 22 to heat the fixing belt 20 efficiently. Alternatively, instead of the retracted portion 23*c* that defines the clearance, the fixing device 9E may incorporate a thermal insulator that has a thermal conductivity smaller than a thermal conductivity of the heater holder 23B as the thermal insulation layer.

According to the embodiments described above, the second thermal conductor 36 is provided separately from the first thermal conductor 28. Alternatively, the fixing device 9E may have other configuration. For example, the first thermal conductor 28 may include an opposed portion that is disposed opposite the gap B and has a thickness greater than a thickness of an outboard portion of the first thermal conductor 28, which is other than the opposed portion.

Application of the technology of the present disclosure is not limited to the color image forming apparatus 100 depicted in FIG. 1 that forms a color toner image. The technology of the present disclosure is also applied to a monochrome image forming apparatus that forms a monochrome toner image, a copier, a printer, a facsimile machine, a multifunction peripheral (MFP) having at least two of copying, printing, facsimile, scanning, and plotter functions, or the like.

Figure 16:
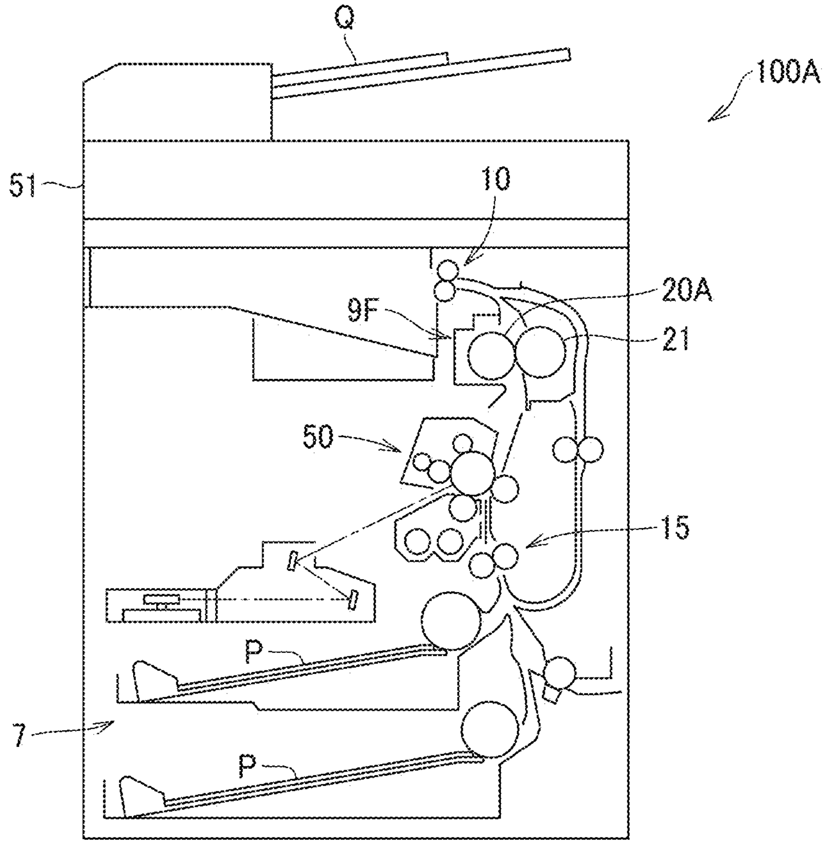
FIG. 16 is a schematic cross-sectional view of an image forming apparatus according to another embodiment of the present disclosure that is different from the image forming apparatus depicted in FIG. 1.

For example, as illustrated in FIG. 16, an image forming apparatus 100A according to an embodiment of the present disclosure includes an image forming device 50 including a photoconductive drum, a sheet conveyance device including the timing roller pair 15, the sheet feeder 7, a fixing device 9F, the output device 10, and a scanner 51. The sheet feeder 7 includes a plurality of sheet trays (e.g., paper trays) that loads a plurality of sheets P having different sizes, respectively.

The scanner 51 reads an image on an original Q into image data. The sheet feeder 7 loads the plurality of sheets P and feeds the sheets P to a conveyance path one by one. The timing roller pair 15 conveys the sheet P conveyed through the conveyance path to the image forming device 50.

The image forming device 50 forms a toner image on the sheet P. For example, the image forming device 50 includes the photoconductive drum, a charging roller, an exposure device, a developing device, a replenishing device, a transfer roller, a cleaner, and a discharger. The toner image is a reproduction of the image on the original Q, for example. The fixing device 9F fixes the toner image on the sheet P under heat and pressure. The sheet P bearing the fixed toner image is conveyed to the output device 10 by a conveyance roller and the like. The output device 10 ejects the sheet P onto an outside of the image forming apparatus 100A.

A description is provided of a construction of the fixing device 9F according to an embodiment of the present disclosure.

A description of a construction of the fixing device 9F, which is common to the fixing device 9 depicted in FIG. 2, is omitted properly.

Figure 17:
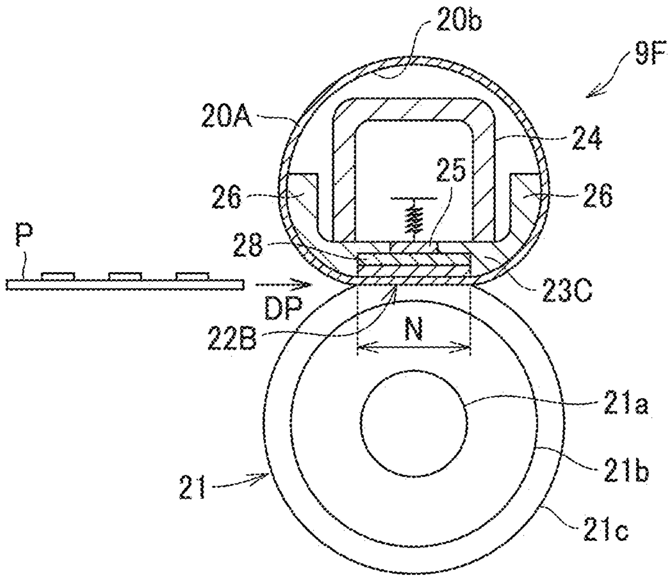
FIG. 17 is a schematic cross-sectional view of a fixing device according to yet another embodiment of the present disclosure, that is incorporated in the image forming apparatus depicted in FIG. 16.

As illustrated in FIG. 17, the fixing device 9F includes a fixing belt 20A, the pressure roller 21, a heater 22B, a heater holder 23C, the stay 24, the thermistors 25, and the first thermal conductor 28.

The fixing nip N is formed between the fixing belt 20A and the pressure roller 21. The fixing nip N has a nip length of 10 mm in the sheet conveyance direction DP. The fixing belt 20A and the pressure roller 21 convey the sheet P at a linear velocity of 240 mm/s.

The fixing belt 20A includes the base layer 201 made of polyimide and the release layer 203 depicted in FIG. 2 and does not include an elastic layer. The release layer 203 is heat-resistant film made of fluororesin, for example. The fixing belt 20A has an outer diameter of approximately 24 mm.

The pressure roller 21 includes the core metal 21*a*, the elastic layer 21*b*, and the surface layer 21*c*. The pressure roller 21 has an outer diameter in a range of from 24 mm to 30 mm. The elastic layer 21*b* has a thickness in a range of from 3 mm to 4 mm.

Figure 18:
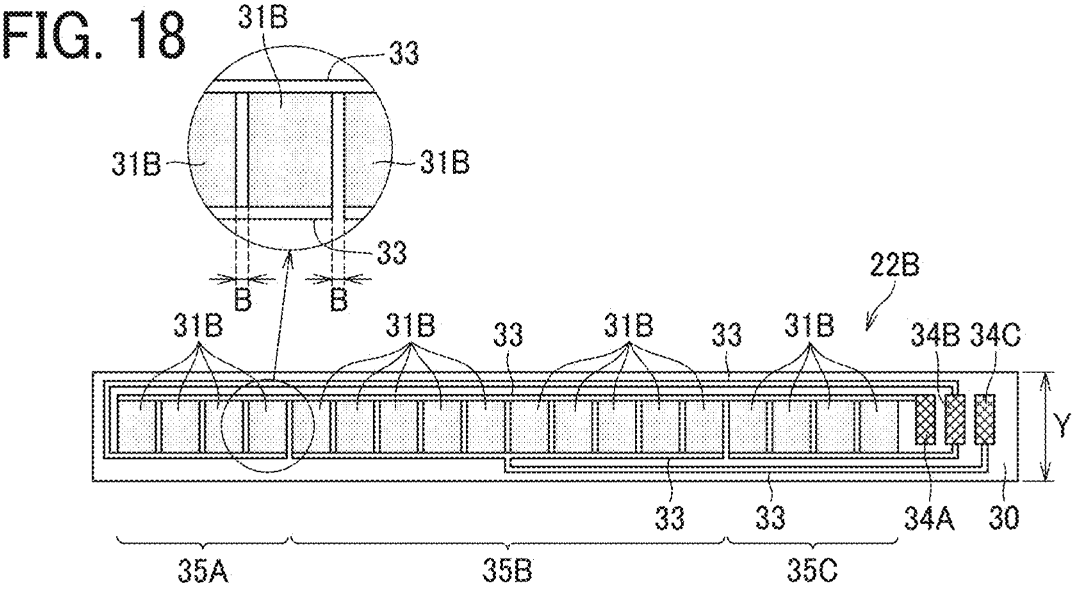
FIG. 18 is a plan view of a heater incorporated in the fixing device depicted in FIG. 17.

As illustrated in FIG. 18, the heater 22B includes the base 30, a thermal insulation layer, a conductor layer including resistive heat generators 31B, and an insulating layer. The heater 22B has a total thickness of 1 mm. The heater 22B has a width of 13 mm in the orthogonal direction Y perpendicular to an arrangement direction in which the resistive heat generators 31B are arranged.

As illustrated in FIG. 18, the conductor layer of the heater 22B includes the plurality of resistive heat generators 31B, feeders 33, the electrodes 34A and 34B, and an electrode 34C. According to the embodiment also, as illustrated in an enlarged view in FIG. 18, the gap B serving as a dividing region is interposed between the adjacent resistive heat generators 31B in the arrangement direction in which the resistive heat generators 31B are arranged. FIG. 18 illustrates the two gaps B in an enlarged view. However, the gap B is disposed at each interval between the adjacent resistive heat generators 31B depicted in FIG. 18. The heater 22B further includes three heat generation portions 35A, 35B, and 35C each of which is constructed of the resistive heat generators 31B. As the electrodes 34A and 34B are energized, the heat generation portions 35A and 35C generate heat. As the electrodes 34A and 34C are energized, the heat generation portion 35B generates heat. For example, in order to fix a toner image on a sheet P having a decreased size not greater than a 35 predetermined size, the heat generation portion 35B generates heat. In order to fix a toner image on a sheet P having an increased size greater than the predetermined size, the heat generation portions 35A, 35B, and 35C generate heat.

Figure 19:
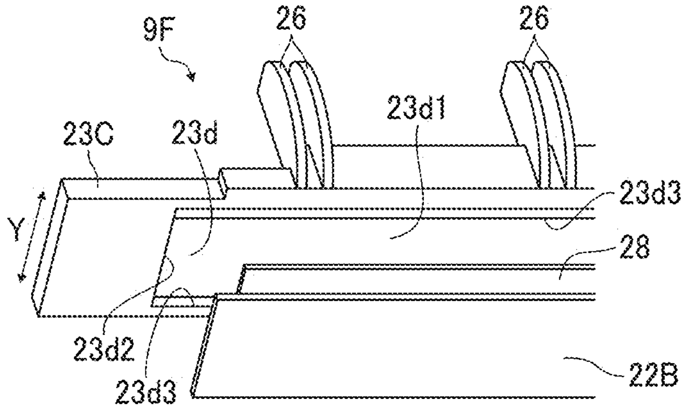
FIG. 19 is a perspective view of the heater depicted in FIG. 18 and a heater holder incorporated in the fixing device depicted in FIG. 17.

As illustrated in FIG. 19, the heater holder 23C includes a recess 23*d* that holds the heater 22B and the first thermal conductor 28. The recess 23*d* is disposed on a heater opposed face of the heater holder 23C, that is disposed opposite the heater 22B. The recess 23*d* includes a bottom face 23*d*1 and walls 23*d*2 and 23*d*3. The bottom face 23*d*1 is substantially parallel to the base 30 and recessed with respect to the heater 22B compared to other faces of the heater holder 23C. The wall 23*d*2 is disposed at at least one of both lateral ends of the heater holder 23C in the arrangement direction in which the resistive heat generators 31B are arranged and serves as an interior wall of the heater holder 23C. The walls 23*d*3 are disposed at both ends of the heater holder 23C in the orthogonal direction Y perpendicular to the arrangement direction and serve as interior walls of the heater holder 23C, respectively. The heater holder 23C mounts the guides 26. The heater holder 23C is made of LCP.

Figure 20:
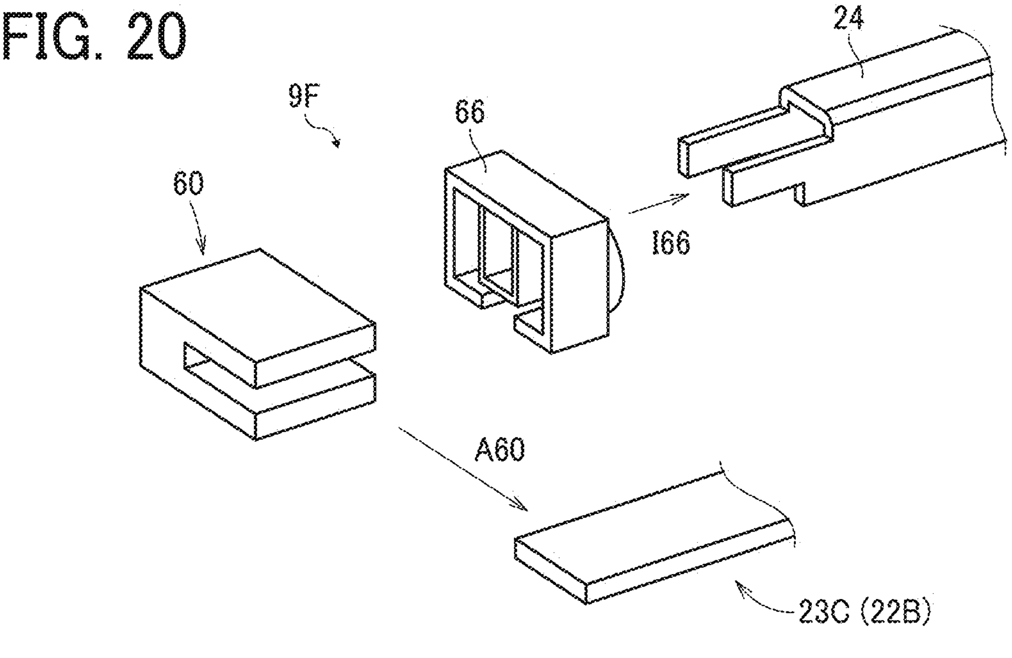
FIG. 20 is a perspective view of the heater depicted in FIG. 19 and a connector to be attached to the heater.

As illustrated in FIG. 20, the fixing device 9F further includes a connector 60 that includes a housing made of resin such as LCP and a plurality of contact terminals disposed in the housing.

The connector 60 is attached to the heater 22B and the heater holder 23C such that the connector 60 sandwiches the heater 22B and the heater holder 23C together at a front face and a back face of the heater 22B and the heater holder 23C. In a state in which the connector 60 sandwiches and holds the heater 22B and the heater holder 23C, as the contact terminals of the connector 60 contact and press against the electrodes 34A, 34B, and 34C of the heater 22B depicted in FIG. 18, the heat generation portions 35A, 35B, and 35C are electrically connected to a power supply disposed in the image forming apparatus 100A through the connector 60. Thus, the power supply is ready to supply power to the heat generation portions 35A, 35B, and 35C. At least a part of each of the electrodes 34A, 34B, and 34C is not coated with the insulating layer and is exposed so that each of the electrodes 34A, 34B, and 34C is coupled with the connector 60.

The belt holder 66 is disposed on each lateral end of the fixing belt 20A in a longitudinal direction thereof. The belt holder 66 contacts the inner circumferential face 20*b* of the fixing belt 20A depicted in FIG. 17 and holds or supports the fixing belt 20A at each lateral end of the fixing belt 20A in the longitudinal direction thereof. The belt holder 66 is secured to a frame of the fixing device 9F. The belt holder 66 is inserted into each lateral end of the stay 24 in the longitudinal direction thereof in an insertion direction 166 illustrated in FIG. 20.

The connector 60 is attached to the heater 22B and the heater holder 23C in an attachment direction A60 illustrated in FIG. 20 that is parallel to the orthogonal direction Y perpendicular to the arrangement direction in which the resistive heat generators 31B are arranged as illustrated in FIG. 18. Alternatively, in order to attach the connector 60 to the heater holder 23C, one of the connector 60 and the heater holder 23C may include a projection that engages a recess disposed in another one of the connector 60 and the heater holder 23C such that the projection moves inside the recess relatively. The connector 60 is attached to one lateral end of the heater 22B and the heater holder 23C in the arrangement direction in which the resistive heat generators 31B are arranged. The one lateral end of the heater 22B and the heater holder 23C is opposite to another lateral end of the heater 22B and the heater holder 23C with which the driver (e.g., a motor) that drives the pressure roller 21 is coupled.

Figure 21:
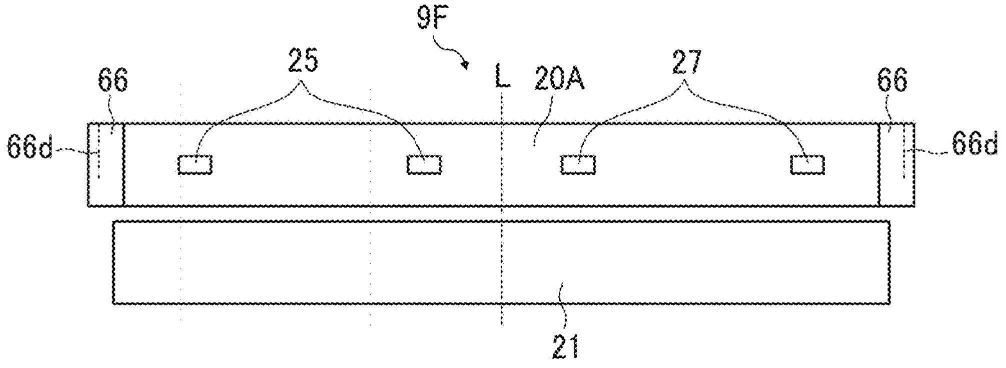
FIG. 21 is a diagram of thermistors, thermostats, and the belt holders incorporated in the fixing device depicted in FIG. 17, illustrating an arrangement of the thermistors and the thermostats.

As illustrated in FIG. 21, the thermistors 25 are disposed opposite the inner circumferential face 20*b* of the fixing belt 20A at a position in proximity to a center line L and a position in one lateral end span of the fixing belt 20A in the longitudinal direction thereof, respectively. The fixing device 9F or the image forming apparatus 100A includes a controller that controls the heater 22B based on a temperature of the fixing belt 20A, that is detected by the thermistor 25 disposed at the position in proximity to the center line L, and a temperature of the fixing belt 20A, that is detected by the thermistor 25 disposed opposite the one lateral end span of the fixing belt 20A in the longitudinal direction thereof, respectively.

The fixing device 9F further includes thermostats 27 that are disposed opposite the inner circumferential face 20*b* of the fixing belt 20A at a position in proximity to the center line L and a position in another lateral end span of the fixing belt 20A in the longitudinal direction thereof, respectively. If the thermostat 27 detects a temperature of the fixing belt 20A, that is higher than a preset threshold, the thermostat 27 breaks power to the heater 22B.

The belt holders 66 contact and support both lateral ends of the fixing belt 20A in the longitudinal direction thereof, respectively. The belt holder 66 is made of LCP.

Figure 22:
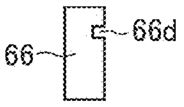
FIG. 22 is a diagram of the belt holder depicted in FIG. 21, illustrating a slide groove incorporated therein.

As illustrated in FIG. 22, the belt holder 66 includes a slide groove 66*d*. The slide groove 66*d* extends in a contact-separation direction in which the fixing belt 20A comes into contact with and separates from the pressure roller 21. The slide groove 66*d* engages an engagement mounted on the frame of the fixing device 9F. As the engagement moves relatively inside the slide groove 66*d*, the fixing belt 20A moves in the contact-separation direction with respect to the pressure roller 21.

A description is provided of advantages of a fixing device (e.g., the fixing devices 9, 9A, 9B, 9C, 9D, 9E, and 9F).

As illustrated in FIGS. 2, 3A, and 4, the fixing device includes a fixing belt (e.g., the fixing belts 20 and 20A), a heater (e.g., the heaters 22, 22A, and 22B), a pressure roller (e.g., the pressure roller 21), a belt holder (e.g., the belt holders 66 and 66A), and a separator (e.g., the separators 40 and 40A).

The fixing belt is endless and rotates in a rotation direction (e.g., the rotation direction D20). The heater heats the fixing belt. The pressure roller presses against the fixing belt to form a nip (e.g., the fixing nip N) therebetween. The belt holder rotatably holds the fixing belt and includes a holding portion (e.g., the holding portions 66*a* and 66*a*A) disposed opposite an inner circumferential face (e.g., the inner circumferential face 20*b*) of the fixing belt at each lateral end of the fixing belt in a longitudinal direction thereof. A recording medium (e.g., the sheet P) is conveyed through the nip. The separator separates the recording medium from the fixing belt. The separator includes a biasing member (e.g., the biasing members 42 and 42A) and a contact portion (e.g., the contact portions 41 and 41A). The biasing member moves the contact portion toward the fixing belt. The contact portion contacts the fixing belt. The contact portion contacts the fixing belt at a contact position that is disposed outboard from a recording medium conveyance region (e.g., the sheet conveyance region R), where the recording medium is conveyed over the fixing belt, in the longitudinal direction of the fixing belt. The contact position is disposed opposite the holding portion of the belt holder via the fixing belt. For example, the contact portion of the separator is disposed outboard from the recording medium conveyance region in the longitudinal direction of the fixing belt and disposed opposite the holding portion of the belt holder via the fixing belt.

Accordingly, the fixing device suppresses change in a distance (e.g., a gap) between the separator and the fixing belt that extend in the longitudinal direction thereof, preventing faulty separation of the recording medium from the fixing belt and damage to the fixing belt.

According to the embodiments described above, the fixing belt 20 serves as a fixing belt. Alternatively, a fixing film, a fixing sleeve, or the like may be used as a fixing belt. Further, the pressure roller 21 serves as a pressure roller. Alternatively, a pressure belt or the like may be used as a pressure roller.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:

a fixing belt that is endless, the fixing belt configured to rotate;

a heater configured to heat the fixing belt;

a pressure roller configured to press against the fixing belt to form a nip, between the fixing belt and the pressure roller, through which a recording medium is conveyed, the pressure roller configured to rotate;

a holding portion opposite an inner circumferential face of the fixing belt at each lateral end of the fixing belt in a longitudinal direction of the fixing belt, the holding portion configured to rotatably hold the fixing belt and the holding portion not extending an entire length, in the longitudinal direction, of the fixing belt; and a separator configured to separate the recording medium from the fixing belt, the separator including:

a body; and a contact portion protruding from the body towards the fixing belt between the body and the fixing belt, the contact portion configured to contact the fixing belt at a contact, the contact portion being outboard from a recording medium conveyance region in the longitudinal direction of the fixing belt, the recording medium conveyance region being where the recording medium is conveyed over the fixing belt, and the contact portion being opposite the holding portion via the fixing belt, and wherein an inner circumferential face of the fixing belt does not contact the holding portion at the contact position; and a biasing member configured to press the contact portion toward the fixing belt.

2. The fixing device according to claim 1, wherein the heater is opposite the nip.

3. The fixing device according to claim 1, wherein the heater includes:

a heat generator configured to generate heat;

a base having a mounting face mounting the heat generator; and a thermal conductor mounted on an opposite face of the base, the opposite face being opposite to the mounting face of the base.

4. The fixing device according to claim 3, wherein the heater is planar.

5. The fixing device according to claim 3, wherein the contact portion is outboard from the heat generator in the longitudinal direction of the fixing belt.

6. The fixing device according to claim 1, wherein the pressure roller is configured to drive and rotate the fixing belt.

7. The fixing device according to claim 1, wherein the fixing belt is made of resin.

8. The fixing device according to claim 1, further comprising a pressure application-release assembly configured to move the pressure roller from a pressing position in which the pressure roller presses against the fixing belt to a pressure release position in which the pressure roller releases pressure applied to the fixing belt.

9. The fixing device according to claim 8, wherein the pressure application-release assembly includes a presser configured to press the pressure roller against the fixing belt to form the nip between the fixing belt and the pressure roller.

10. The fixing device according to claim 1, wherein the contact portion is made of an elastic material that deforms elastically.

11. The fixing device according to claim 1, wherein the fixing belt has an outer diameter that is greater than an outer diameter of the pressure roller.

12. The fixing device according to claim 1, wherein the fixing belt includes:

a base layer that is tubular;

an adhesion layer on the base layer; and a surface layer on the adhesion layer.

13. The fixing device according to claim 1, wherein the heater includes a plurality of heat generators arranged in the longitudinal direction of the fixing belt.

14. The fixing device according to claim 1, wherein the holding portion has a slit and is C-shaped in cross section.

15. The fixing device according to claim 1, wherein the holding portion is tubular.

16. The fixing device according to claim 1, wherein the biasing member includes one of a flat spring or a torsion spring.

17. The fixing device according to claim 1, wherein the contact portion is configured to maintain a gap between the body and the fixing belt via a slight pressure with the fixing belt, the slight pressure being an amount that does not deform or displace the fixing belt.

18. The fixing device according to claim 1, wherein a shape of a cross section of the holding portion is a C-shape.

19. The fixing device according to claim 1, wherein the body is longer, in the longitudinal direction, than a recording medium conveyance region where the recoding medium is conveyed over the fixing belt, and wherein the contact portion is configured to contact the fixing belt at a first contact position and a second contact position of the fixing belt, the first contact position being outboard from the recording medium conveyance region at a first side of the recording medium conveyance region and the second position being at a second side, opposite from the first side, of the recording medium conveyance region.

20. An image forming apparatus comprising:

an image bearer configured to bear an image; and a fixing device configured to fix the image on a recording medium, the fixing device including:

a fixing belt that is endless, the fixing belt configured to rotate;

a heater configured to heat the fixing belt;

a pressure roller configured to press against the fixing belt to form a nip between the fixing belt and the pressure roller, the nip through which the recording medium is conveyed, the pressure roller configured to rotate;

a holding portion opposite an inner circumferential face of the fixing belt at each lateral end of the fixing belt in a longitudinal direction of the fixing belt, the holding portion configured to rotatably hold the fixing belt and the holding portion not extending an entire length, in the longitudinal direction, of the fixing belt; and a separator configured to separate the recording medium from the fixing belt, the separator including:

a body; and a contact portion protruding from the body towards the fixing belt between the body and the fixing belt, the contact portion configured to contact the fixing belt at a conte on, the contact portion being outboard from a recording medium conveyance region in the longitudinal direction of the fixing belt, the recording medium conveyance region being where the recording medium is conveyed over the fixing belt, the contact portion being opposite the holding portion via the fixing belt, ax an inner circumferential fac e of the fixing belt does n portion at the contact position; and a biasing member configured to press the contact portion toward the fixing belt.

* * * * *